United States Patent
Ceccarelli et al.

(10) Patent No.: US 11,317,272 B2
(45) Date of Patent: Apr. 26, 2022

(54) METHOD AND SYSTEM FOR ENABLING BROADBAND ROAMING SERVICES

(71) Applicant: Telefonaktiebolaget LM Ericsson (publ), Stockholm (SE)

(72) Inventors: Daniele Ceccarelli, Sollentuna (SE); Mukunda Nemade, Lawrenceville, NJ (US); Srinivasa Prasad, Hillsborough, NJ (US); Chirag Parekh, Piscataway, NJ (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/770,696

(22) PCT Filed: Dec. 28, 2017

(86) PCT No.: PCT/IB2017/058492
§ 371 (c)(1),
(2) Date: Jun. 8, 2020

(87) PCT Pub. No.: WO2019/130047
PCT Pub. Date: Jul. 4, 2019

(65) Prior Publication Data
US 2021/0168582 A1 Jun. 3, 2021

(51) Int. Cl.
*H04W 8/06* (2009.01)
*H04W 28/24* (2009.01)
*H04W 40/34* (2009.01)

(52) U.S. Cl.
CPC ............ *H04W 8/06* (2013.01); *H04W 28/24* (2013.01); *H04W 40/34* (2013.01)

(58) Field of Classification Search
CPC ........... H04W 8/02; H04W 8/04; H04W 8/06; H04W 8/10; H04W 8/12; H04W 8/14;
(Continued)

(56) References Cited

U.S. PATENT DOCUMENTS

| | | | |
|---|---|---|---|
| 6,560,217 B1 * | 5/2003 | Peirce, Jr. | H04L 45/58 370/351 |
| 8,514,828 B1 * | 8/2013 | Verma | H04L 12/4633 370/338 |

(Continued)

FOREIGN PATENT DOCUMENTS

| | | | |
|---|---|---|---|
| WO | 2007130969 A2 | 11/2007 | |
| WO | WO-2007130969 A2 * | 11/2007 | ............ H04W 8/20 |
| WO | 2012057607 A1 | 5/2012 | |

OTHER PUBLICATIONS

PCT International Search Report and Written Opinion, dated May 9, 2018 for International Application PCT/IB2017/058492, 18 pages.

(Continued)

*Primary Examiner* — Dominic E Rego
(74) *Attorney, Agent, or Firm* — Sage Patent Group

(57) ABSTRACT

A method and system for supporting roaming broadband services. The method is implemented by a computing device in a parent provider network of a user having a unique user identifier to enable the user to utilize services associated with a broadband access service contract of the user of the parent provider network in a visited location in the parent provider network or in a roaming provider network. The method includes receiving a registration request from the user, determining the unique user identifier for the user, determining services for the user based on the unique user identifier, determining whether the user is connected to a home customer premise equipment (CPE) in the parent provider network, and configuring services and resources at a local data center in the parent provider network, in response to the user being connected to the visited location in the parent provider network.

16 Claims, 14 Drawing Sheets

(58) Field of Classification Search
CPC ......... H04W 8/16; H04W 8/20; H04W 40/34; H04W 28/24
See application file for complete search history.

(56) References Cited

U.S. PATENT DOCUMENTS

| | | |
|---|---|---|
| 9,078,033 B2 | 7/2015 | Nicol et al. |
| 9,258,575 B2 | 2/2016 | Kanojia et al. |
| 2002/0071536 A1* | 6/2002 | Boutwell ............ H04M 15/854 379/115.01 |
| 2005/0033853 A1 | 2/2005 | Jones et al. |
| 2005/0147226 A1 | 7/2005 | Anupam et al. |
| 2005/0237982 A1* | 10/2005 | Pankajakshan ......... H04L 12/66 370/338 |
| 2007/0240192 A1 | 10/2007 | Acharya et al. |
| 2008/0089295 A1* | 4/2008 | Keeler ................. H04L 67/18 370/332 |
| 2008/0316960 A1* | 12/2008 | Daigle ................... H04L 65/80 370/329 |
| 2013/0142046 A1* | 6/2013 | Zhou .................... H04W 28/24 370/230 |
| 2015/0085664 A1* | 3/2015 | Sachdev ............ H04L 41/5019 370/236 |
| 2017/0311244 A1 | 10/2017 | Kodaypak et al. |

OTHER PUBLICATIONS

Vodafone, "Customers to be always connected", Oct. 19, 2016, 8 pages.
Tata Communications, "Tata Communications MOVE WiFi+" 2017, 7 pages.
TMobile, Gogo® "In-flight Wi-Fi and texting included", 3 pages.
Optimum, "Optimum Cable partner Hotspot Network", 3 pages.

* cited by examiner

METHOD AND SYSTEM FOR ENABLING BROADBAND ROAMING SERVICES

CROSS-REFERENCE TO RELATED APPLICATIONS

This application is a 35 U.S.C. § 371 national stage application for International Application No. PCT/IB2017/058492, entitled "METHOD AND SYSTEM FOR ENABLING BROADBAND ROAMING SERVICES", filed on Dec. 28, 2017, the disclosures and contents of which are hereby incorporated by reference in their entireties.

TECHNICAL FIELD

Embodiments of the invention relate to the field of network management and administration; and more specifically, to a process and system to enable network service subscribers to access their subscribed services in a location and network access provider independent manner.

BACKGROUND

Internet service providers (ISPs) provide a range of services to subscribers that are typically tied to the home or business location of the subscriber to a fixed broadband service. The fixed broadband service provides network and Internet access to the single location. The ISP also may provide additional services beyond network access that can include parental controls, bandwidth provisions, firewalls and similar services. A high number of these subscribers may frequently connect to networks at different locations and require fixed broadband access from those locations.

An example of this type of usage pattern is a family with a summer house or a family with one or more members working for a number of days per week/month in a different location. In the case of multiple connection locations, then the family needs to have a different broadband access contract (often from different operators) for the different locations where the family members may need network access. This causes a huge waste of money and an under usage of resources for both the subscriber and the providers. It would be ideal for the subscriber to have network access and service access that is location independent.

Even in those cases where it is not possible to provide network access that move from one location to another, it would be desirable for the subscriber to be able to access the services from other locations through other providers. In this case, the subscriber could just pay for the network access twice and not the entire package of services. However, such roaming services are not offered and there isn't a network infrastructure that would support such functionality.

SUMMARY

In one embodiment, a method is provided for supporting roaming broadband services. The method is implemented by a computing device in a parent provider network of a user having a unique user identifier to enable the user to utilize services associated with a broadband access service contract of the user of the parent provider network in a visited location in the parent provider network or in a roaming provider network. The method includes receiving a registration request from the user, determining the unique user identifier for the user, determining services for the user based on the unique user identifier, determining whether the user is connected to a home customer premise equipment (CPE) in the parent provider network, and configuring services and resources at a local data center in the parent provider network, in response to the user being connected to the visited location in the parent provider network.

In another embodiment, a further method is provided for supporting roaming broadband services. This method is implemented by a computing device in a roaming provider network of a user having a unique user identifier to enable the user to utilize services associated with a broadband access service contract of a user of a parent provider network in the roaming provider network. The method includes receiving a registration request from the user visiting the roaming provider network, determining the unique user identifier for the user, identifying the parent provider network for the user, requesting the broadcast access service information for the user from the parent provider network, receiving the broadband access service information from the parent provider network, and instantiating service for the user in the roaming provider network at a local customer premise equipment (CPE) in the roaming provider network.

In another embodiment, a computing device implement the method for supporting roaming broadband services. The method is implemented by the computing device in the parent provider network of the user having the unique user identifier to enable the user to utilize services associated with broadband access services contract of the parent provider network in a visited location in the parent provider network or in a roaming provider network. The computing device includes a non-transitory computer-readable medium having stored therein a roaming support interface, and a processor coupled to the non-transitory computer-readable medium, the processor to execute the roaming support interface. The roaming support interface receives a registration request from the user, determines the unique user identifier for the user, determines broadband access services for the user based on the unique user identifier, determines whether the user is connected to a home customer premise equipment (CPE) in the parent provider network, and configures broadband access services and resources at a local data center in the parent provider network, in response to the user being connected to the visited location in the parent provider network.

In a further embodiment, a computing device implements another method for supporting roaming broadband services. This method is implemented by the computing device in the roaming provider network of the user having the unique user identifier to enable the user to utilize services associated with a broadband access service contract of a parent provider network in the roaming provider network. The computing device includes a non-transitory computer-readable medium having stored therein a roaming support interface, and a processor coupled to the non-transitory computer-readable medium. The processor to execute the roaming support interface. The roaming support interface to receive a registration request from the user visiting the roaming provider network, to determine the unique user identifier for the user, to identify the parent provider network for the user, to request the SLA for the user from the parent provider network, to receive the SLA from the parent provider network, and to instantiate service for the user in the roaming provider network at a local customer premise equipment (CPE) in the roaming provider network.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
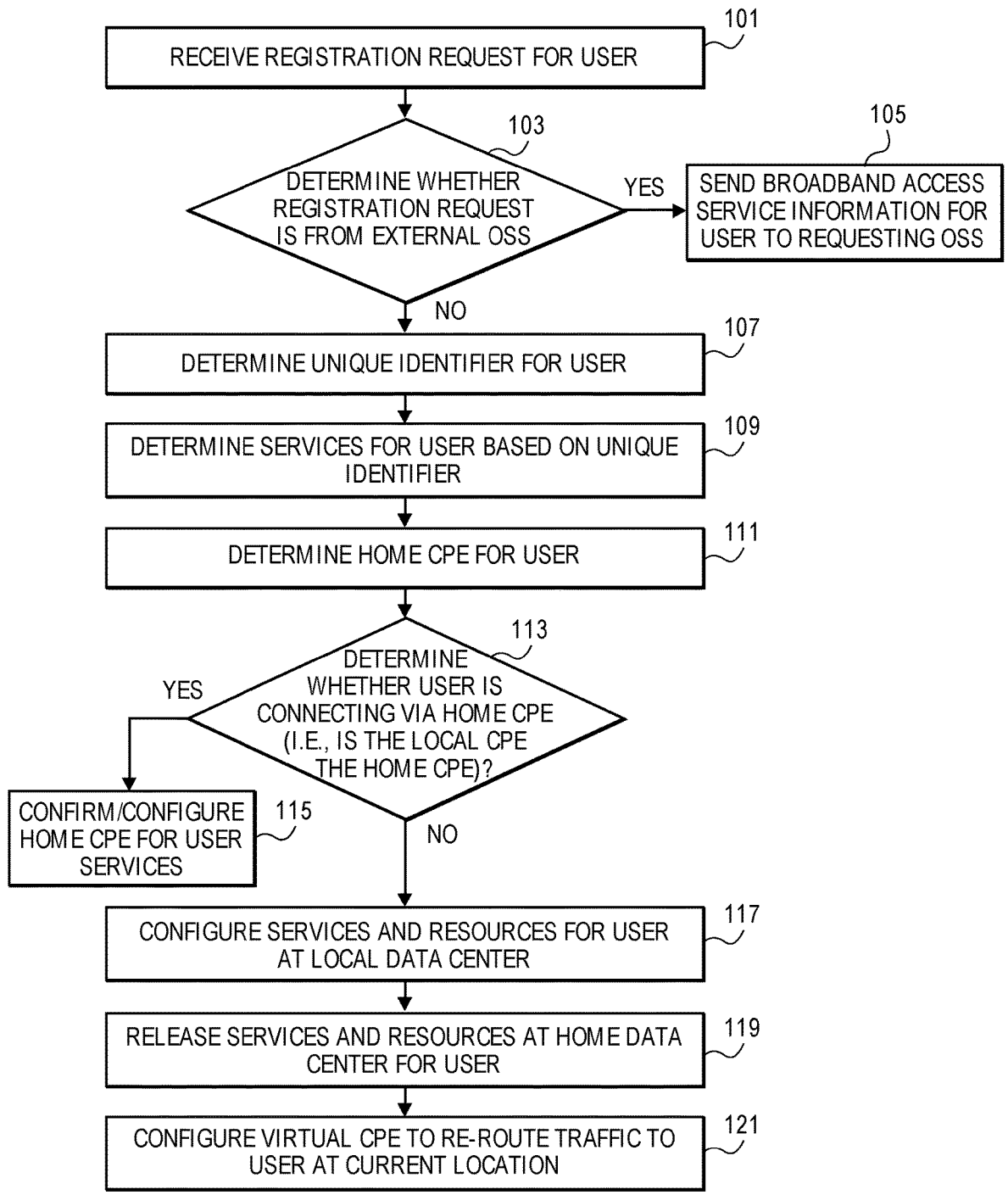
FIG. 1 is a diagram of one embodiment of the operations of a OSS or BSS in a parent provider network to support roaming broadband access services.

The following description describes methods and apparatus for enabling broadband services access when a user is not in a home network or connecting through a home customer premise equipment (CPE). The embodiments enable a user to access some or all of the broadband services that a user may have contracted for via a service level agreement (SLA) or similar contract with a network provider. The embodiments enable access to these broadband services where the user may connect to a network other than the network of the provider with which the user has a broadband services contract or SLA. The embodiments define the processes, mechanisms and interfaces that enable this access of broadband services at remote locations including in visited networks managed by any broadband service provider.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. These terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Overview

A high number of users frequently connect to broadband services from different locations and require a fixed broadband access from those locations. 'Broadband' as described herein refers to network services that are always on (as opposed to dial-in) with high internet speeds in terms of data throughput. Many users have broadband access services through a communication service provider (CSP), an Internet Service Provider (ISP) or similar service, which may provide network access via coaxial cable, Ethernet, fixed wireless or similar mediums. For sake of conciseness, the example of an ISP is used herein. However, one skilled in the art would understand that the principles, processes and structures also apply to any CSP or similar service. The broadband access service is contracted with the provider via an agreement that may be referred to as a service level agreement, which may detail the services provided (e.g., network address translation (NAT), firewalls, parental controls and similar services) as well as the characteristics of the broadband service such as data throughput and similar characteristics. The characteristics of a user's contracted broadband access services in type and metrics as well as the range of services provided with access are referred to herein simply as broadband access service. The broadband access service can encompass multiple users (e.g. a family of users) and multiple user devices (e.g., the devices of various family members).

In the prior art, the broadband access service is location specific, via a customer premise equipment (CPE) such as a local networking device or gateway that provides access to the provider network for the users. However, as mentioned above it is desirable to users that they may be able to utilize their broadband access service at remote locations. A classic example of remote location usage is a family with a summer house or a family with one or more members working for a number of days per week/month in a different location. In this case the family needs to have a different broadband access contract (often from different operators) for the different locations where the family members may need to connect to broadband access services. This scenario causes a huge waste of money and under usage of the resources for this family. The family will have to contract with broadband access service providers at each location and will only utilize these services for limited time periods despite likely paying for full continuous network access.

Even in those cases where it is not possible to move from one location to another and enable the broadband access service to travel with a user, it would be beneficial to enable the virtual services of the user to be available, in which case the user may pay for the broadband access twice, but not have to pay for the entire package of services twice. Currently, broadband access service providers cannot offer roaming for the fixed access nor for the services connected to it as there is not process, mechanism or interface to support such a roaming service.

Thus, the prior art has limitations in providing the mobility of broadband access and services/policies at different geographical locations within and across broadband access service providers (i.e., access offered on different broadband technologies and services available preferably with similar SLAs). The embodiments provide a process, system and set of interfaces to enable the offering of roaming broadband access services.

The embodiments overcome these limitations of the prior art by defining method and a workflow for the dynamic allocation and moving of broadband access services as well as the associated broadband access contract or SLA along with the moving of the user. In some embodiments, an extension to standard metro Ethernet forum (MEF)/lifecycle service orchestration (LSO) interfaces is defined between: operations support systems (OSS) interfaces (e.g. the Interlude interfaces); and OSS and business support systems (BSS) (e.g. Legato+Sonata) interfaces when the broadband access contract allows for dynamically renegotiation of the subscriber (i.e., user) contract (e.g., add/remove allowed locations, services etc.).

The embodiments, enable the user to utilize his/her broadband access services at different locations covered the same broadband access service provider on different user devices or the transfer of the user's broadband access services including SLAs and services/policies by providing an interface between two Broadband access service providers systems.

The embodiments provide advantages both for the users and the Broadband access service providers. For users (e.g. home and business subscribers), the users desire cost efficiency and seamless access to broadband and its related services, the users want to avoid having separate agreements/billing with different Internet Service Providers at different locations (private and public), and at the least broadband access portability to enable the use of active services at different locations of the broadband access service provider (e.g., roaming broadband access service that move from CPE to CPE or from virtual CPE (vCPE) to vCPE).

For broadband access service providers, the embodiments enable resource usage efficiency and customer base expansion. The embodiments, increase the customer base (e.g., monetize with low capital expenditures) and optimize broadband resource usage. Some example broadband access services/policies that may reside on the Customer Premise Equipment (virtual or physical) and/or broadband access service provider's data centers that users would like to utilize while roaming include but are not limited to, (these services/policies may be defined per user or per device (type)): Internet Security and Parental Control; Firewall with Black-list/White-list of users/devices (deep packet inspection (DPI) services); provider virtual private network (VPN) services (to access home/office servers); provider's Video-on-Demand (VoD) and DVR services; provider's Internet Protocol (IP) TV and voice over IP (VoIP) services; virtual compute resources (from providers); and virtual storage resources (from providers) e.g. managed services like cloud backup.

In the embodiments, the users apply or contract with a Primary Provider (i.e., a primary broadband access services provider) for a given Broadband/Internet Plan at their primary location and then can opt for any combination of the following broadband roaming services which may include: seamless access at public places (e.g., hotel, airports, in-flight, stadiums, etc.); committed seamless access and service availability at private places (e.g., home, business e.g. summer and winter homes, businesses spread at different locations); providers may offer plans (e.g., universal access pass/login), pay per device(s), pay per user, pay per use (e.g., usage limits), and/or any combination of these and similar.

The embodiments provide an apparatus node that serves as an orchestrator (e.g., an OSS function or module) that enables the registration and availability of users broadband access services/policies at different locations covered by the same broadband access service provider on different user devices, a method to automate the seamless registration of users and devices and the transfer of user's broadband access service including SLAs and services/policies based on a unique user identifier (UUID), an interface between two (or more) broadband access service providers orchestration systems that enables roaming services to exchange the broadband user profiles, services and policies to enables seamless connectivity to the user and devices across different geographical locations, the usage, metering and SLA exchange interface, protocol and methods, and the moving of a physical CPE where all associated services/policies will be transferred.

The embodiments enable broadband access service roaming access and seamless service/policy availability for different users/devices at different locations moving within a single broadband access service provider (e.g., within an ISP). This includes a case where there is a single data center with user services deployed in the same data center and a case where there are multiple data centers with user services moved to a different data center along with the user. The embodiments also enable roaming among multiple broadband access service providers (e.g., different ISPs). This includes cases where no broadband access services e.g., SLA re-negotiation is supported or allowed and cases where broadband access services e.g., SLA re-negotiation is allowed and enabled.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

FIG. 1 is a diagram of one embodiment of the operations of a OSS or BSS in a parent provider network to support roaming broadband access services. The process begins with the OSS or BSS receiving a registration request for a user (Block 101). This registration request may be sent via a CPE of the user or other network device. The registration request signals to the OSS or BSS the identity of the user to enable determination of the contracted broadband access services associated with the user. The registration request can have any format or contents. In some embodiments, the user may authenticate with the OSS or BSS as part of or before the registration process. The authentication can involve the supplying of a password that is verified by the OSS or BSS to ensure the identity and security of the user. The OSS or BSS, hereinafter the example of the OSS is utilized for sake of conciseness and clarity, with one of ordinary skill in the art understanding that an OSS, BSS or similar component can carry out these functions, determines the location of the user (Block 103).

The user may be connecting via the parent provider, i.e., the broadband access service provider that made the primary contract for services with the user and in whose network the home or business location associated with the user is located. In other cases, the user may be connecting via a roaming provider, i.e., a broadband access service that is not directly contracted with by the user. In either case, the user may be registering via any number of devices associated with the user. The registration can be per user, such that the user is separately identified from other individuals that are a part of the same contract for broadband access services, e.g., family members.

In the case where the user is connecting via a roaming provider (RP) network, then the OSS may response by providing broadband access service information for the user to the requesting OSS of the RP (Block 105). This scenario is discussed further herein below with relation to FIG. 3. In this case, the OSS may also negotiate with the OSS of the RP (or in some cases a BSS) to determine which terms and features of the broadband access service will be provided by the RP. The negotiation can take any form or format and example interfaces are discussed further herein below.

In the case where the user is connecting within the parent provider (PP) network, the process may continue by looking up the unique identifier of the user (Block 107). The unique user identifier (UUID) can have any size or format such that it is globally unique within the PP network and/or across all networks. The OSS can determine all of the broadband access services associated with the UUID by accessing databases or similar structures that store SLA information and similar broadband access service contract information. With this information retrieved using the UUID, then the process can determine the appropriate broadband access services associated with the user (Block 109) and configure the CPE connected to the device of the user to provide these services to the user. To affect this configuration process, the OSS determines the connected CPE for the user (Block 111). The CPE may be identified in the registration request or may be determined based on path information associated with a registration request. Any mechanism for identifying the connected CPE can be utilized.

The connected CPE is compared with a known 'home' CPE for the user (Block 113). The home CPE can be the CPE associated with the home or business residence of the user and that is identified by the broadband access service contract information or similar information data bases accessible to the OSS and which can be searched based on the UUID. In the case where the user is connected to the home CPE then the OSS can confirm that the home CPE is properly configured, e.g., for new users or new registration requests (Block 115). However, if the user has previously registered and there is no change in the state of the CPE or broadband access services associated with the user then no action may need to be taken.

If the user is connecting via a new or non-home CPE then the connected CPE may be configured to implement the broadband access services associated with the UUID (Block 117). This can be carried out at the connected CPE and/or a data center that is associated with the connected CPE that may implement any number or combination of the broadband access services for the user. In some cases, the resources or services of the user can then be released at the home CPE or a data center associated with the home CPE (Block 117). With the location of the user known to be external to the home, these resources can be freed for the use other and thereby more efficiently use these resources in the PP network (Block 119). As mentioned, these resources are user specific and any resources associated with other user on the same broadband access service contract may be unaffected.

A virtual CPE that is responsible for traffic routing at a home data center of the PP network can also be configured to ensure that data traffic sent to the user at an address associated with the home CPE or home data center is properly forwarded to the user at the new location (Block 121). This ensures that data traffic and services are not interrupted for the user as a result of a move to a new location in the PP network.

Figure 2A:
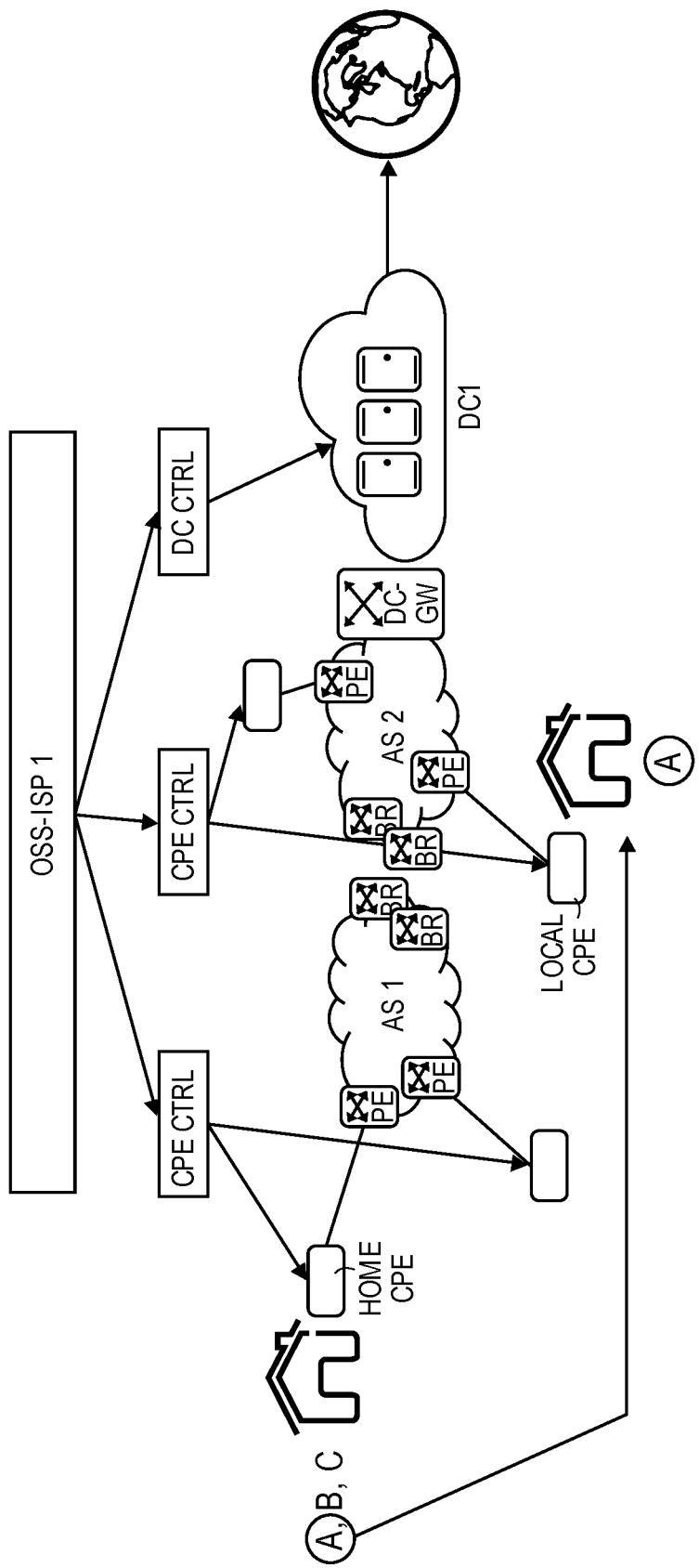
FIG. 2A is a diagram one example embodiment of the roaming broadband access services within a parent provider (PP) network.

FIG. 2A is a diagram one example embodiment of the roaming broadband access services within a PP network. The example of FIG. 2A illustrates one case of the application of the process of FIG. 1. In this case, the PP network is a single ISP with a single data center. In this example scenario, the user A moves from one site in the PP network to another site within the same PP network and keeps the broadband access services associated with that user installed in the same data center. What the OSS needs to do is to configure the local CPE and vCPE of the new location so that the broadband access services can be reached from the same data center and implemented for user A. The broadband access services related to users' B and C (e.g., family members on the same contract with the PP) are kept in place in the original home location.

Figure 2B:
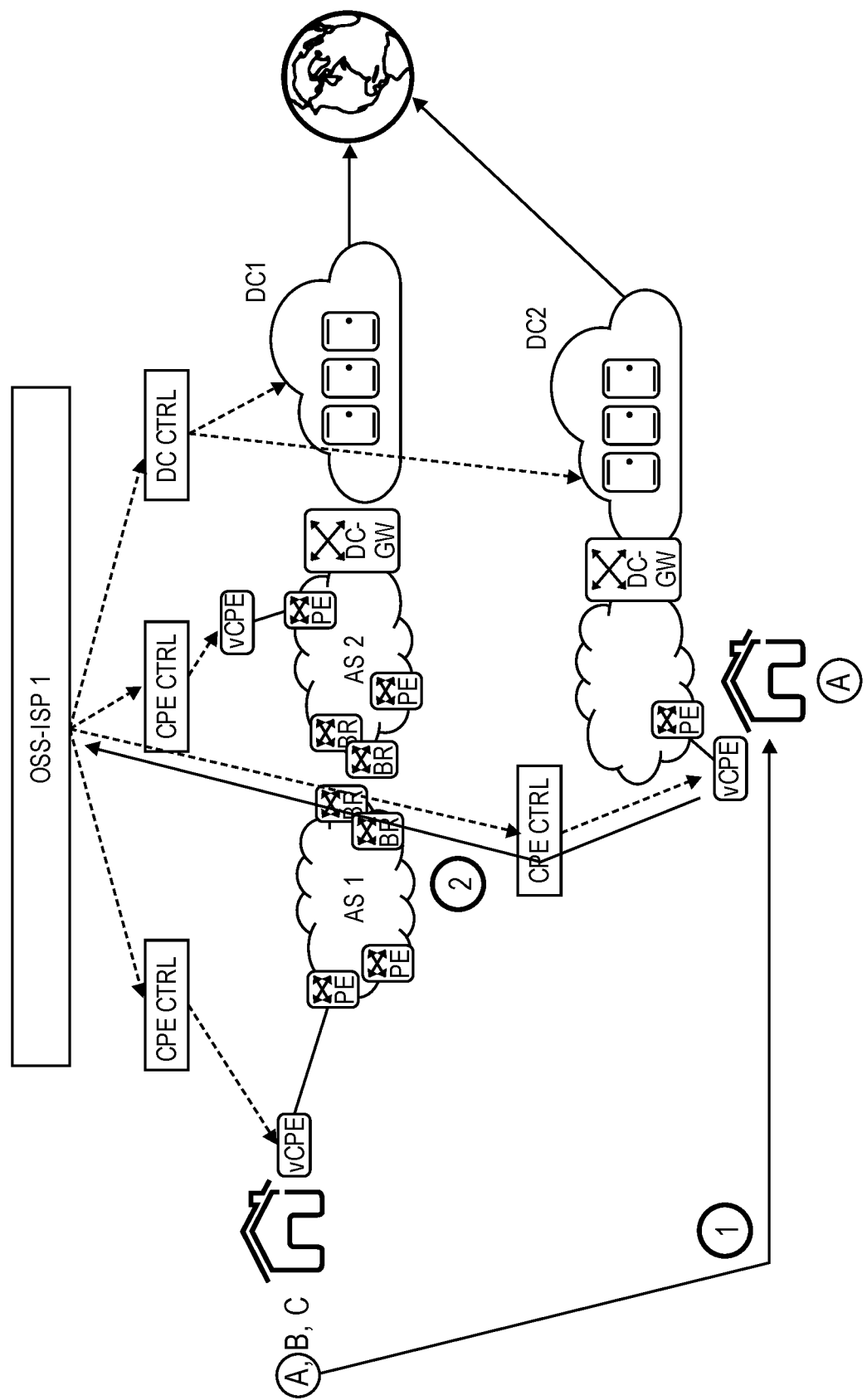
FIGS. 2B-2D are diagrams of one example embodiment of the roaming broadband access services within a PP network.
Figure 2C:
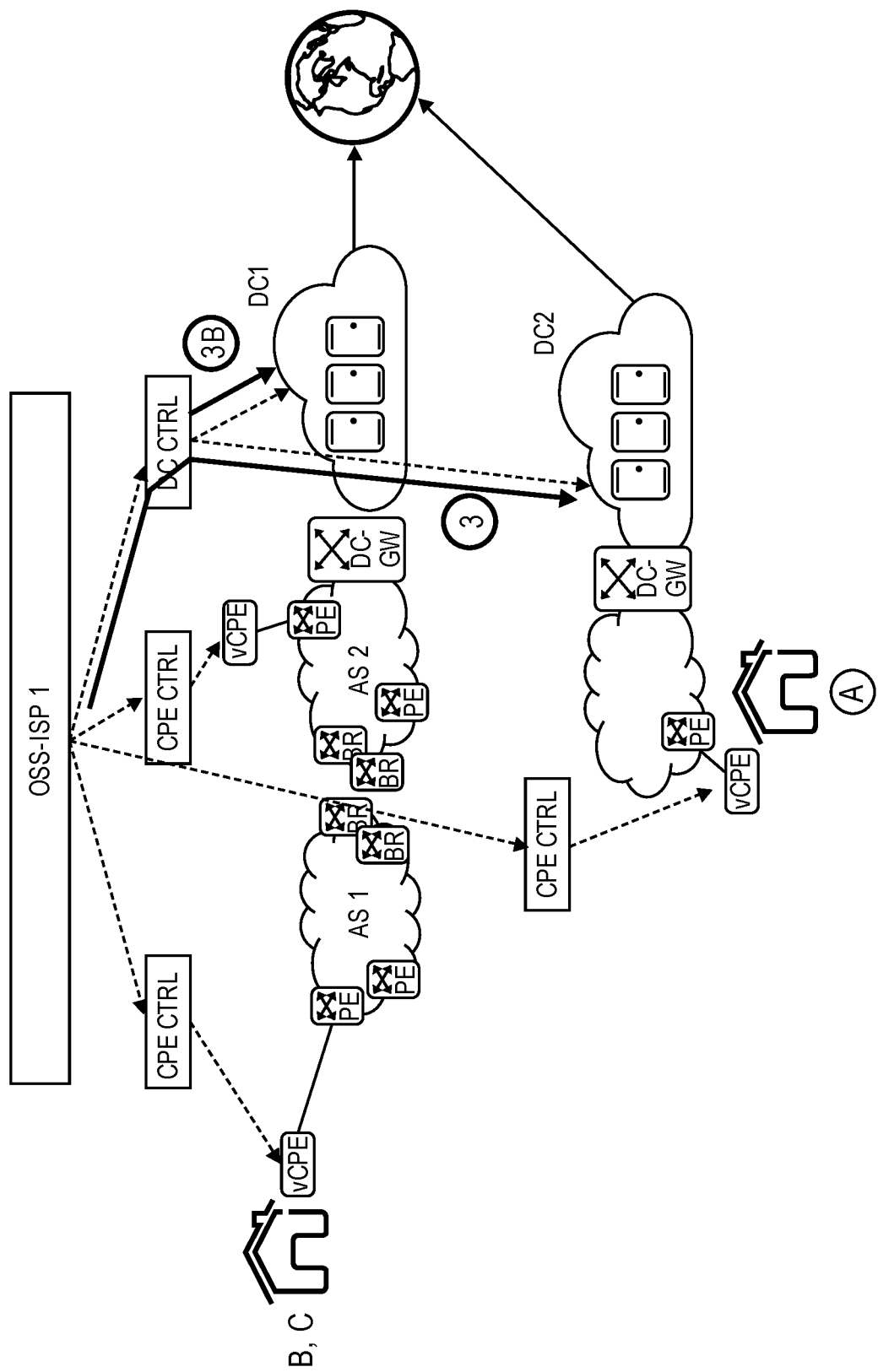
Figure 2D:
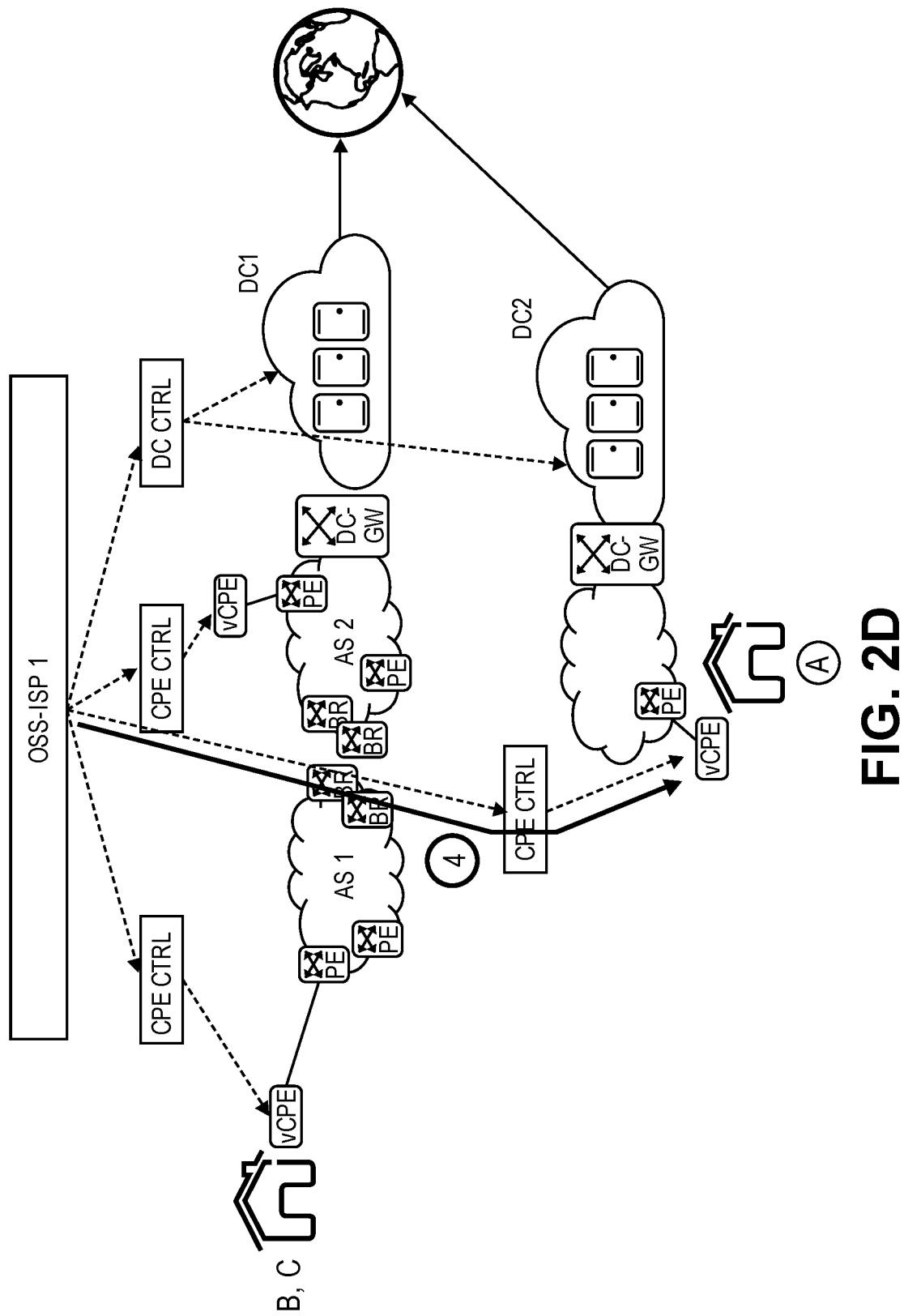

FIGS. 2B-2D are diagrams of one example embodiment of the roaming broadband access services within a PP network. The example of FIGS. 2B-2D illustrates another case of the application of the process of FIG. 1. In this example scenario, the PP network is a single ISP, but has multiple data centers. This scenario is similar to the scenario of FIG. 2A, with the difference that the user A is moving from one location in the PP network to another location in the PP network that requires the moving of the broadband access services for that user from one data center to another, which is owned or managed by the same PP. PP networks and ISP networks generally, may include multiple data centers for any number of reasons including distance from customers/users, reachability or availability. In this case, the process proceeds through the steps as defined with relation to FIG. 1, where user A (or more precisely user device A) connects at a new location in the PP network (1). A registration message is sent to the OSS via the local CPE controller (2).

Moving now to FIG. 2C, the OSS configures the broadband access services related to user/device A in data center 2 (DC2) (i.e., the data center that is used to access the Internet from the new connection location) (3). This configuration is done by the OSS via the data center controller. Optionally, the broadband access services and resources allocated to user A are released in data center 1 (DC1). The resources related to users B and C are kept in DC1. Other devices belonging to user A may remain at the home location in which case these devices may be separately registered by the user A and resources allocated for these devices are not freed when the roaming device connects. Similarly, other users on the contract can move locations and the resources specific to that user and device can be moved along with the user and device to the new location without disturbing resources allocated for other users or devices that are not roaming.

FIG. 2D illustrates a fourth step where the vCPE in DC2 is configured by the OSS, via the local CPE controller such that the data traffic generated by the user A at the new location is routed properly. In other words, the vCPE ensures that data traffic destined for user A is forwarded to the new location and that outbound data traffic from the user A at the new location A can reach the Internet and its ultimate destination.

Figure 3:
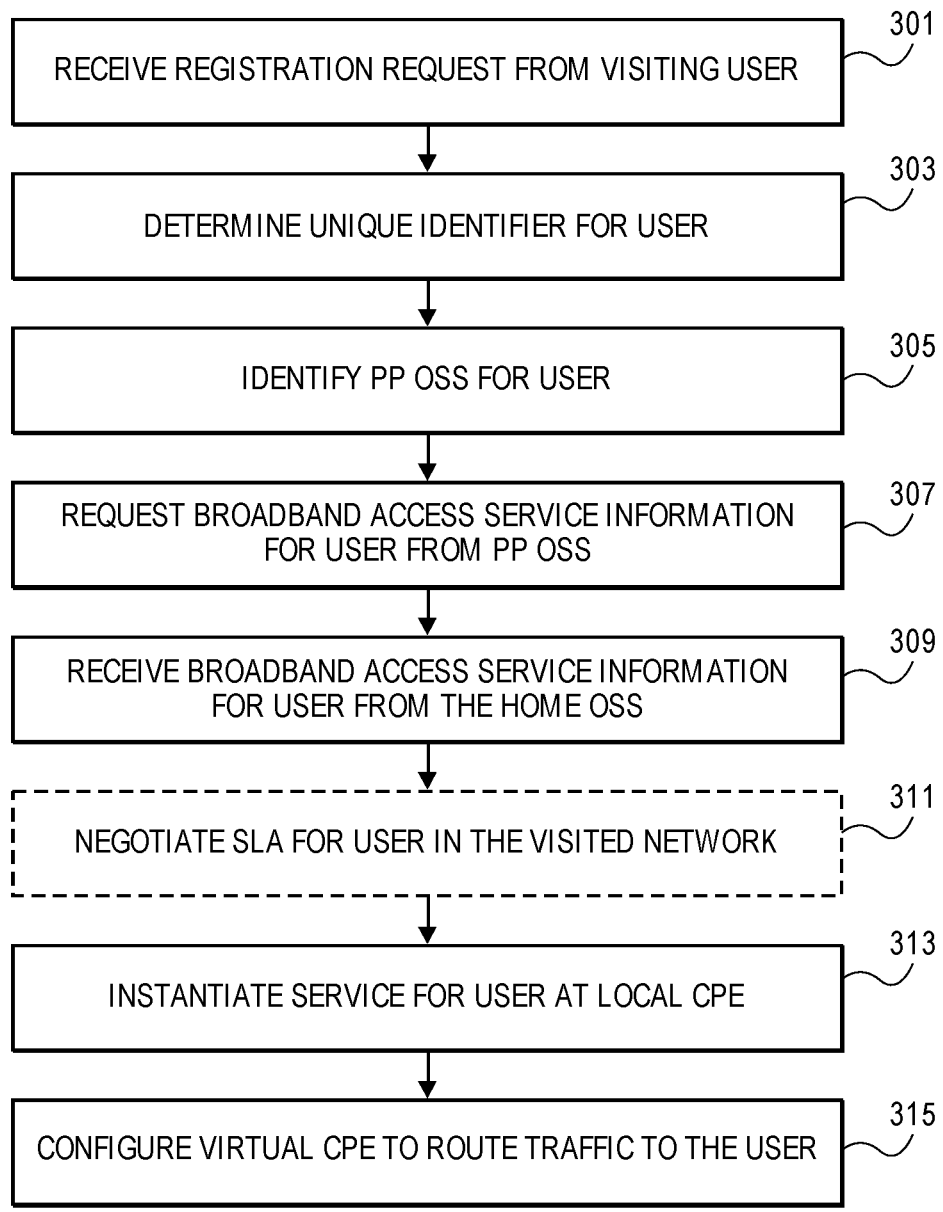
FIG. 3 is a flowchart of one embodiment of the operation of the OSS or BSS in a roaming provider (RP) network.

FIG. 3 is a flowchart of one embodiment of the operation of the OSS or BSS in a RP network. The process is initiated in response to a user device connecting to a RP network and generation a registration request that is sent to the OSS or BSS of the RP network (Block 301). The example of a OSS performing the process is utilized herein after for sake of conciseness. However, one skilled in the art would understand that the process can be carried out by a BSS or similar system. The registration process may also encompass an authentication process where the user provides a password or similar authentication information to enable the user to be verified by the OSS. This may require several steps including communication with the PP network OSS to complete the authentication.

The OSS determines the UUID for the registering user, which may be a part of the registration request or similarly determined (Block 303). The registration request may have any organization, format or content. The UUID is used to determine an PP network and associated OSS for the user (Block 305). The ISPs may exchange information related to UUIDs associated with their networks or similar information exchanges may be made to enable the OSS to lookup the UUID and determine whether the user PP network. With the PP OSS identified, the process can contact the PP OSS to obtain the broadband access service information associated with a contract (e.g., SLA) between the user and the PP (Block 307).

The OSS will then receive the broadband access service information from the PP OSS (Block 309). The PP OSS may complete the authentication based on authentication information sent in the requests from the RP OSS before providing the broadband access service information request. In some embodiments, this may be initiated a negotiation between the RP and PP or more precisely the RP OSS and the PP OSS regarding the services and quality of access to be provided by the RP network while the user is attached to the RP network. The RP and PP may have agreements and policies that facilitate an automated negotiation of the services and quality of access to be provided and any subset of the services and the quality of access provided by the PP network may be agreed upon for the RP network to provide.

Once an agreement has been reached, the OSS begins to instantiate the agreed upon services for the user at the connected/local CPE (Block 313). Similarly, the OSS will configure a vCPE to handle data traffic routing to/from the Internet and the user device location in the RP network. In the PP network, the PP OSS may release resources specific to the user or the user device that it has been notified are now in the RP network.

Figure 4A:
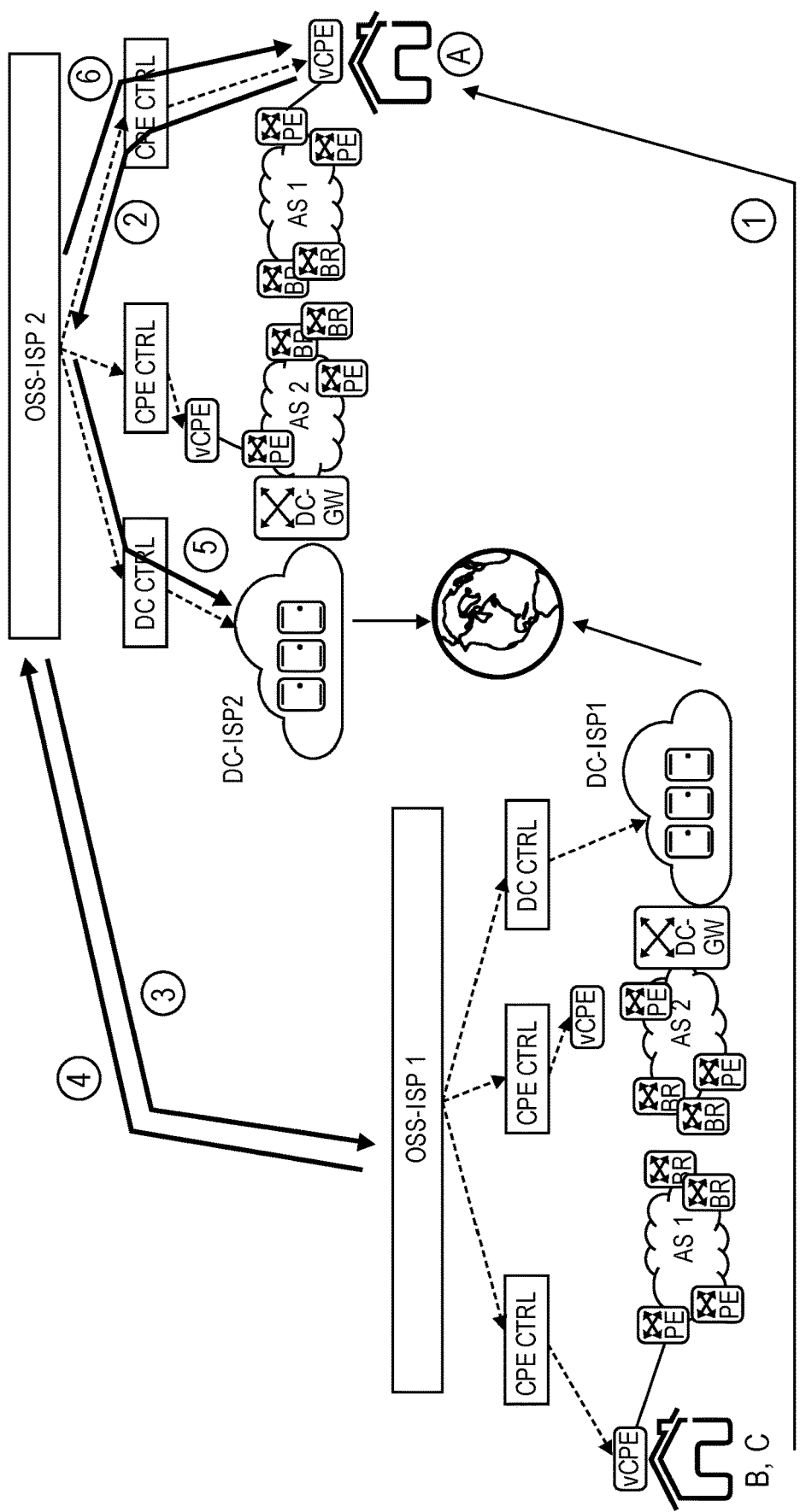
FIG. 4A is a diagram of a scenario where the RP network provides roaming broadband access services with no SLA re-negotiation.
Figure 4B:
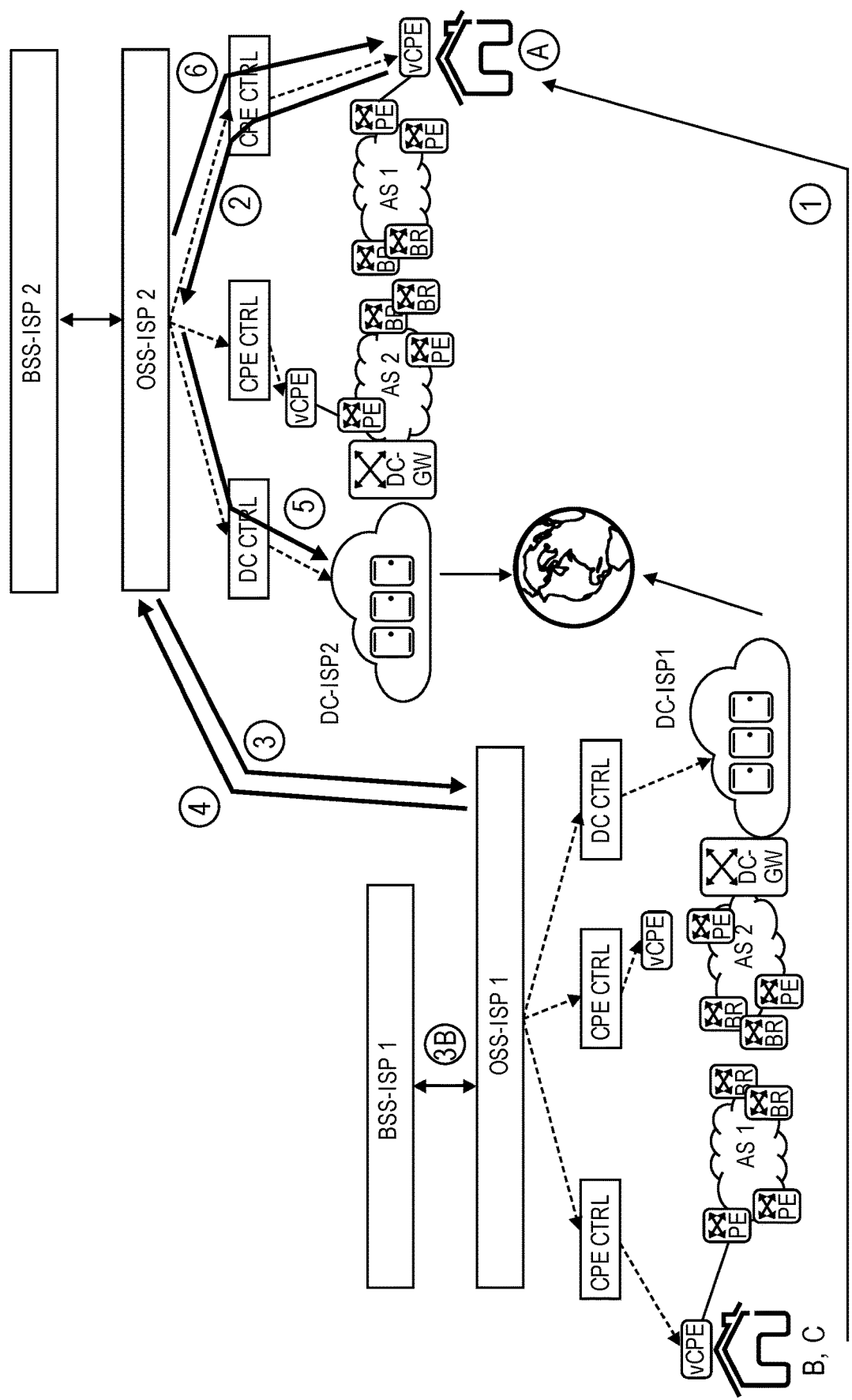
FIG. 4B is a diagram of one embodiment of a scenario where the RP network provides roaming broadband access services with SLA re-negotiation.

FIGS. 4A and 4B are diagrams of example scenarios for the application of the processes of FIGS. 1 and 3 in which a user is visiting an RP network. FIG. 4A is a diagram of a scenario where the RP network provides roaming broadband access services with no SLA re-negotiation. This example scenario is a situation in which a user A moves from one location served by the PP network (ISP1) to a location served by a RP network (ISP2). Here an interface and an interaction between the OSS systems of the two ISPs is provided by the embodiments. The process begins with user A connecting to a CPE in a location served by a different ISP (i.e., a RP network) (e.g. in in the same country or even different country) (1). The user A begins registration with the OSS of the RP network ISP2 (2). The RP network OSS (ISP 2 OSS) notifies the PP network (ISP1) OSS about user A connecting and queries for parameters needed to configure the user A's services in a data center of the RP network (i.e., DC-ISP2) (3). This query is a request for broadband access service information. The PP OSS (ISP1 OSS) responds with service and quality of access information where is some embodiments the SLA of user A is sent to the RP OSS (4). The two OSS may negotiate a new agreement (e.g., a new SLA) the terms of which are provided to the PP OSS.

Once the terms of services and quality of service are decided, then the RP OSS can instantiate the services in the DC (DC-ISP2) (5). Similarly, the RP OSS can configured the vCPE in the DC to route the data traffic to for user A from the Internet.

FIG. 4B is a diagram of one embodiment of a scenario where the RP network provides roaming broadband access services with SLA re-negotiation. This scenario is similar to that of FIG. 4A, in which a user moves his broadband access and services from a site managed by a PP (ISP1) to a site managed by a RP (ISP2), but this time a dynamic re-negotiation of the contract/SLA is allowed, with a consequent interaction of the OSS system with the BSS one. The workflow (steps 1-6) described with relation to FIG. 4A scenario still is applicable, but the process further adds an optional step (3B). The previous method can be potentially augmented with the possibility to dynamically change the SLA of the user. For example, in the case there is no agreement between PP (ISP1) and RP (ISP2), in this case the request (3) can be forwarded to the BSS to dynamically change the SLA and bill user A accordingly.

Figure 5:
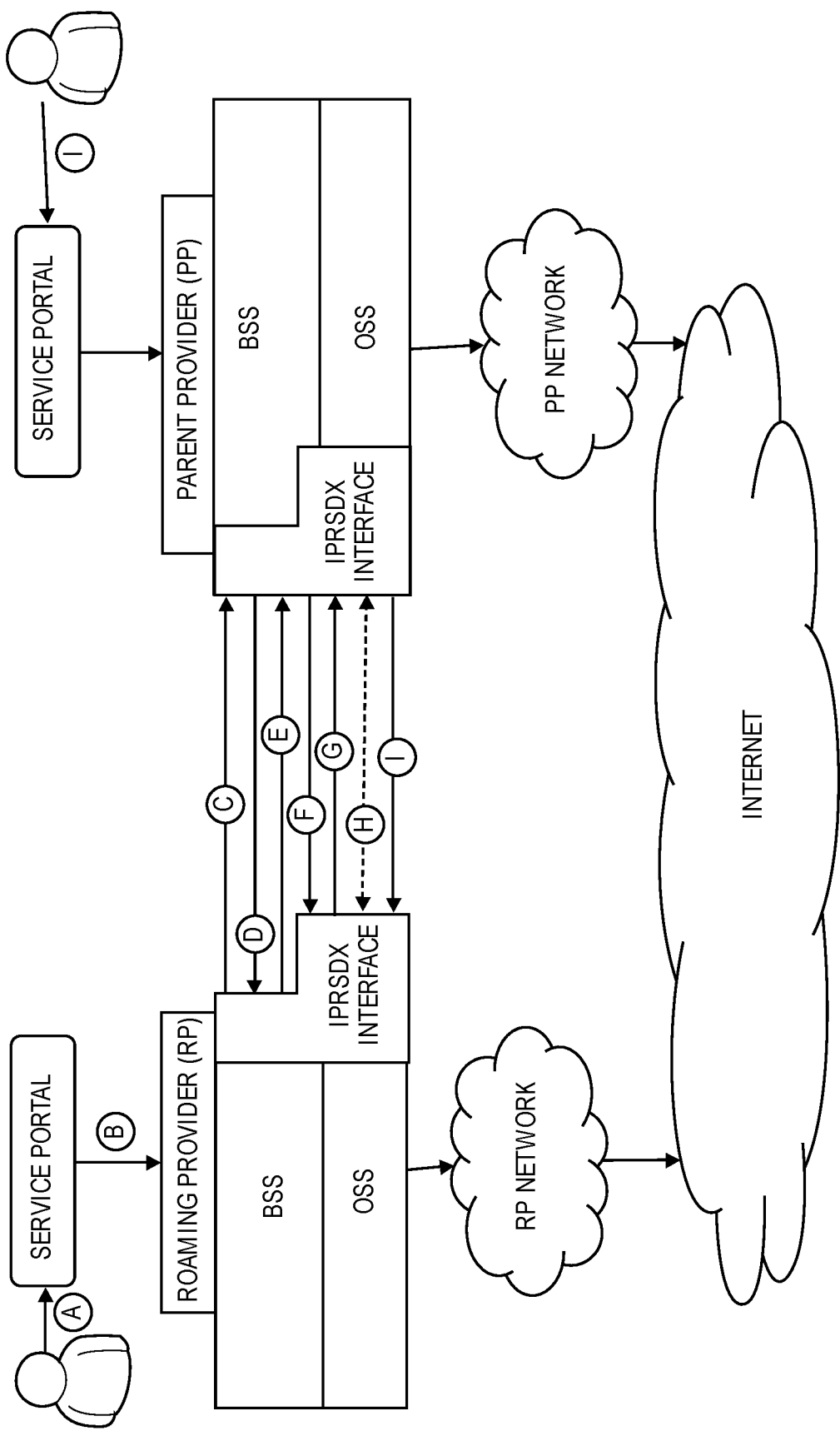
FIG. 5 is a diagram of one embodiment of an interface for OSS systems and information exchange between providers.
Figure 6:
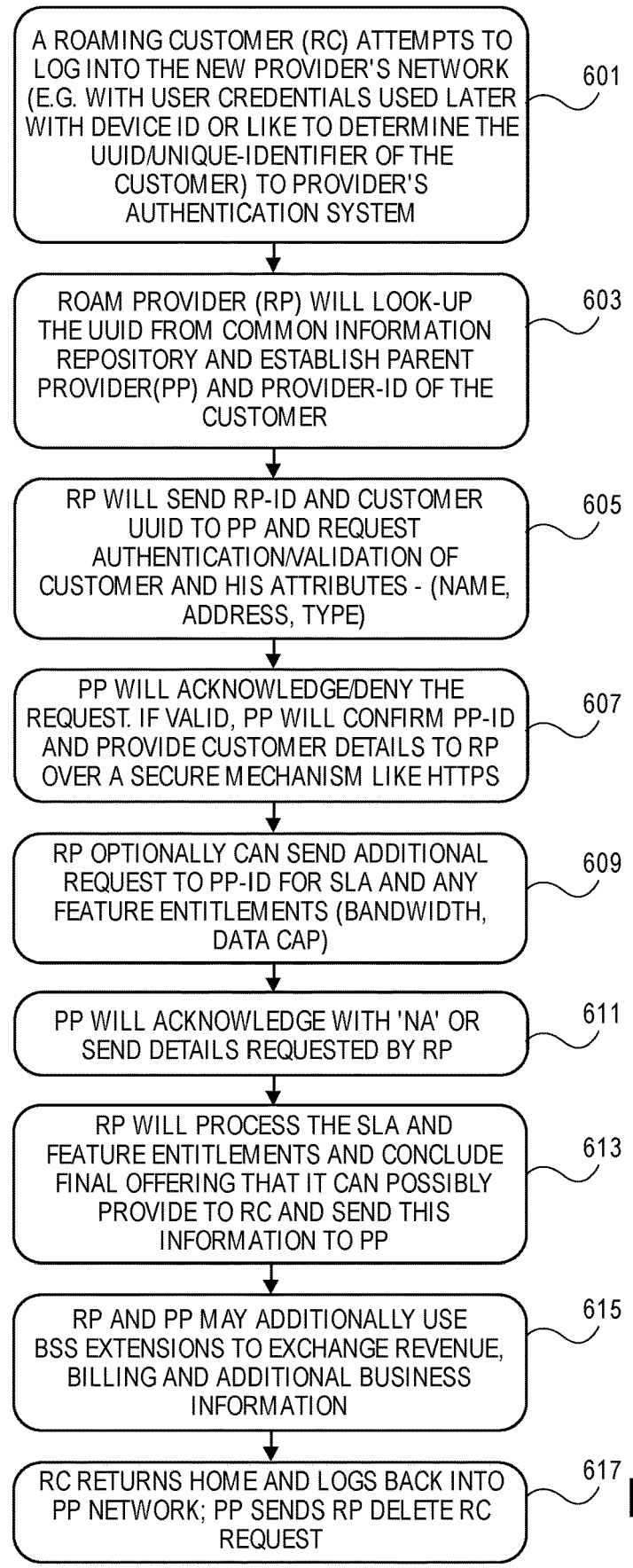
FIG. 6 is a diagram of that illustrates a process implemented via the interface of FIG. 5.

FIG. 5 is a diagram of one embodiment of an interface for OSS systems and information exchange between providers. The illustrated interfaces are provided by way of example rather than limitation, where one skilled in the art would understand that other interfaces and exchanges that are consistent with the principles, structures and processes described herein are encompassed by the embodiments. The interfaces is defined for user between the OSS systems, for example the OSS systems that needs to be deployed in scenarios illustrated herein above. The diagram shows an interface, which may be referred to as an Inter-Provider Roaming Service Data eXchange (IPRSDX interface) that is defined between the OSS systems and the different interactions (labeled with letters) implemented by this interface. FIG. 6 is a diagram of that illustrates a process implemented via the interface of FIG. 5. The flowchart of Figure provides a description of each label in FIG. 5 in the form of a flow chart.

As shown if FIGS. 5 and 6, the first step (601) is initiated by a user (roaming customer (RC) attempting to log into a new/visited provider network. The user may input credentials, which are used later with a device identifier or similar information to determine/generate the UUID, to the provider's authentication system. The RP OSS then looks up the UUID from a common information repository and determines the PP network and a provider identifier for the user (step 603). The RP OSS can send the identifier of the RP network or RP OSS along with the user UUID to the PP OSS and request authentication/validation of the user as well as information about the user (step 605).

The PP OSS can acknowledge the request from the RP OSS (step 607). If the user information is authenticated the PP OSS can confirm the provider identifier and the UUID of the user. The PP OSS can also provide information about the contract of the user for broadband access services. This communication can be via s secure mechanism such as hyper-text transfer protocol security (HTTPS) or similar secured protocol. The RP OSS can optionally send an additional separate request to the PP OSS to request the SLA of the user (step 609). The PP OSS can acknowledge the SLA request with a negative acknowledgement (NA) or send the requested information to the PP OSS (step 611).

The RP OSS can process the provided broadband access services information (e.g., an SLA of the user) and determine a set of services and quality of access to be provided to the visiting user (RC) (step 613), which is sent as a notification to the PP OSS. The RP and PP OSS's may additionally employ BSS extensions to exchange revenue, billing and additional business information (step 615). As used herein, the term broadband access services is intended to be general to the BSS and OSS information exchanged including SLA information, quality of access information, billing and revenue information etc. The visiting user (RC) can subsequently return to the PP network and log back into that network, at which point the PP OSS may send a notification to the RP OSS to free resources allotted for the user and potentially to provide the PP OSS with any final tally of charges or used resources as well as a request to remove user information from the RP network (step 617).

Figure 7:
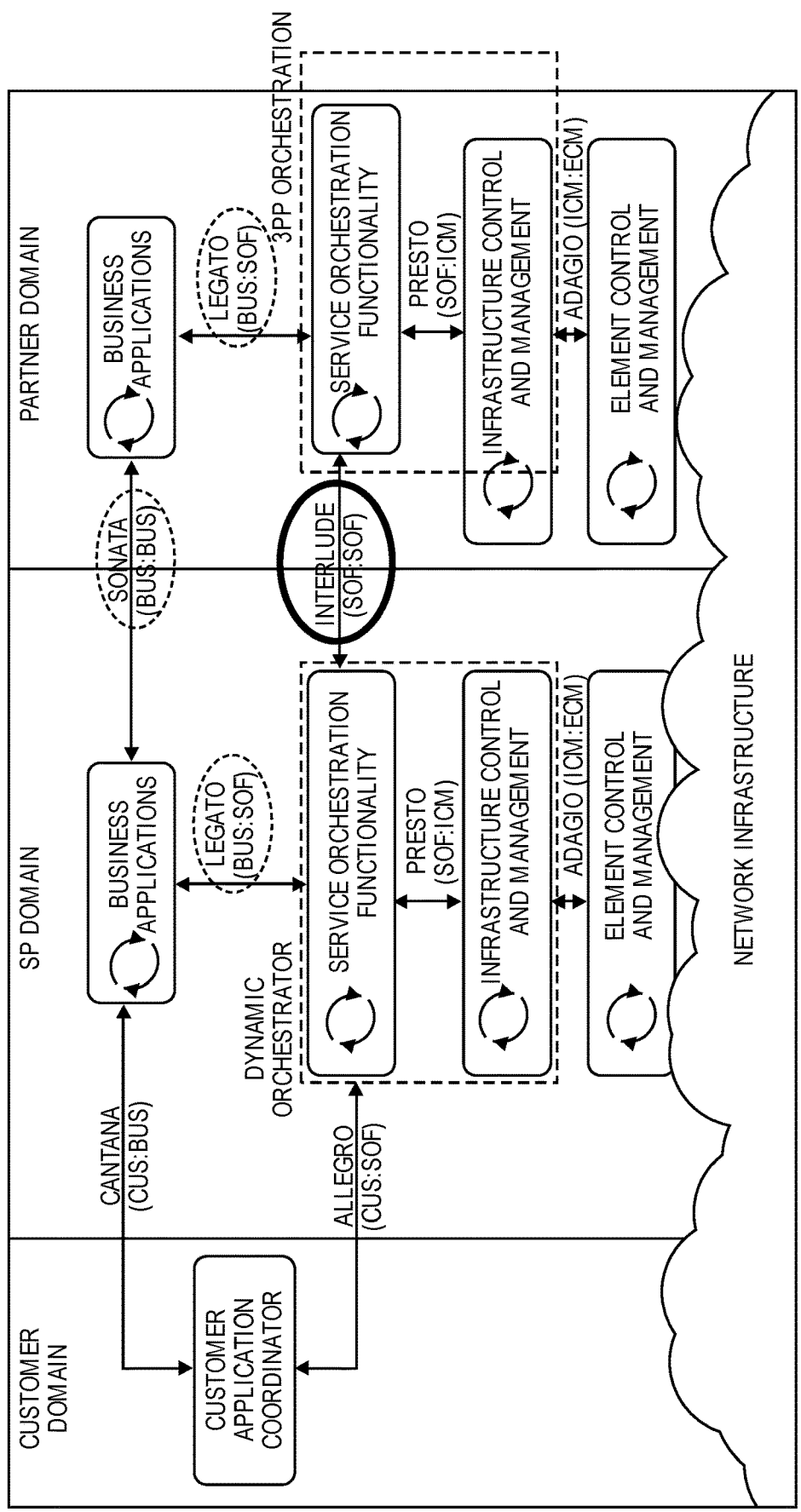
FIG. 7 is a diagram of one example of a network infrastructure between various domains that support roaming broadband access services.

FIG. 7 is a diagram of one example of a network infrastructure between various domains that support roaming broadband access services. The embodiments define the information that needs to be exchanged over the OSS to OSS interface (i.e., IPRSDX) in the form of an information model. The embodiments also provide the mapping against other interfaces of the standard MEF LSO architecture as an example but this focuses on the information that needs to be exchanged and not on its encoding or it's mapping against standard interfaces as the concepts can be applied to a plurality of standard (and nonstandard) interfaces.

The infrastructure illustrated in FIG. 7 is shows an example application of the embodiments to the MEF LSO (Life cycle orchestration) architecture, where the Interlude interface could be used in one example to exchange the service and configuration information between the user's service provider (PP) and the partner provider (RP) when porting the broadband access services from one location to another. This corresponds to the interface described in relation to FIGS. 5 and 6 the methods described herein above.

As mentioned above, the embodiments define a generic interface profile for use with the inter-provider roaming service data exchange (IPRSDX) over TCP/IP based Internet. The information model message extensions defined as part of this interface can be applied as extensions to any applicable existing standard interface. The embodiments are a protocol agnostic functional description with structure and operations to be supported to allow for seamless exchange of information between providers. The interface is defined to be logically part-of OR as a plug-in OR as an extension to OSS/BSS components of the service provider to allow for seamless broadband roaming service configuration, management and activation. In particular, this interface will list definitions for standard message extensions for exchange of service, customer and provider related data. In cases where this is to be adopted as an extension of any existing interface, the information model of existing interface will be added to include the definitions required to support IPRSDX.

The interface of the embodiments can allow for various types of data exchange operations including authentication and customer attributes, provider attributes (e.g., parent/roaming), add or delete functions, SLA and feature entitlement information exchange, negotiated final service offers for visiting users, BSS extensions and data exchange amongst other types of data exchanges.

The embodiments can augment the format of the requests exchanged between the provider OSS's with a universal unique identifier for the user (UUID) and a number of parameters identifying in particular the parent provider, a code for the parent region and the characteristics of the services to be moved.

An example request format is provided herein below as an information model.

```
Request Format:
{
    UUID: <Universal Unique Identifier E.g., Version 4 UUID
    Parent-Provider-id: <String>
    Parent-Region-Code: <String>
    Parent-Service-Characteristics: [
        Bandwidth:<String>,
        Profile: <String>,
        Data-Cap:<String>
        Services: [
            CloudStorage:<String>
            VPN:<Boolean>
        ]
    ]
}
Sample Request:
{
    UUID: 030daa53-6ba9-4692-980c-fdb1a05b60ca
    Parent-Provider-id: COMNYC05
    Parent-Region-Code: USENY
    Parent-Service-Characteristics: [
        Bandwidth:45Mbps,
        Profile: Gold,
        Data-Cap:5GB
        Services: [
            CloudStorage:50GB
            VPN:True
        ]
    ]
}
```

```
Response Format:
{
    status: {
        requestStatus: <String> Valid values: SUCCESS, ERROR
            or WARNING
        messages: [
            messageCode: <String>
            messageValues: Collection<String>
            messageText: <String>
        ]
    }
    data: {
        requestId: <String>
    }
}
Response Sample:
{
    status: {
        requestStatus: SUCCESS
    },
    data: {
        requestId: 958daa53-6ba9-4692-980c-fdb1a05b60cb
    }
}
```

Figure 8A:
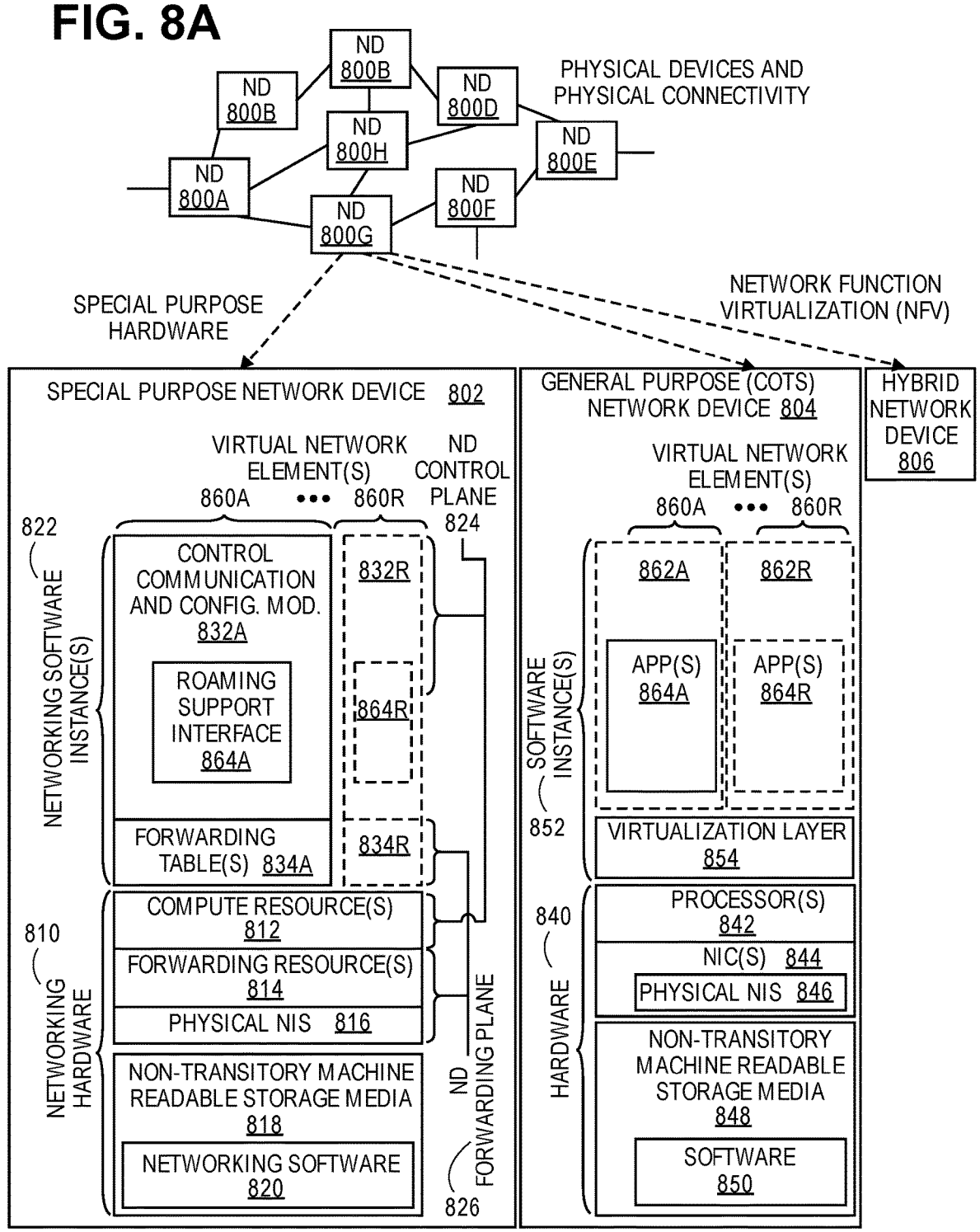
FIG. 8A illustrates connectivity between network devices (NDs) within an exemplary network, as well as three exemplary implementations of the NDs, according to some embodiments of the invention.

FIG. 8A illustrates connectivity between network devices (NDs) within an exemplary network, as well as three exemplary implementations of the NDs, according to some embodiments of the invention. FIG. 8A shows NDs 800A-H, and their connectivity by way of lines between 800A-800B, 800B-800C, 800C-800D, 800D-800E, 800E-800F, 800F-800G, and 800A-800G, as well as between 800H and each of 800A, 800C, 800D, and 800G. These NDs are physical devices, and the connectivity between these NDs can be wireless or wired (often referred to as a link). An additional line extending from NDs 800A, 800E, and 800F illustrates that these NDs act as ingress and egress points for the network (and thus, these NDs are sometimes referred to as edge NDs; while the other NDs may be called core NDs).

Two of the exemplary ND implementations in FIG. 8A are: 1) a special-purpose network device 802 that uses custom application-specific integrated-circuits (ASICs) and a special-purpose operating system (OS); and 2) a general-purpose network device 804 that uses common off-the-shelf (COTS) processors and a standard OS.

The special-purpose network device 802 includes networking hardware 810 comprising a set of one or more processor(s) 812, forwarding resource(s) 814 (which typically include one or more ASICs and/or network processors), and physical network interfaces (NIs) 816 (through which network connections are made, such as those shown by the connectivity between NDs 800A-H), as well as non-transitory machine-readable storage media 818 having stored therein networking software 820. During operation, the networking software 820 may be executed by the networking hardware 810 to instantiate a set of one or more networking software instance(s) 822. Each of the networking software instance(s) 822, and that part of the networking hardware 810 that executes that network software instance (be it hardware dedicated to that networking software instance and/or time slices of hardware temporally shared by that networking software instance with others of the networking software instance(s) 822), form a separate virtual network element 830A-R. Each of the virtual network element(s) (VNEs) 830A-R includes a control communication and configuration module 832A-R (sometimes referred to as a local control module or control communication module) and forwarding table(s) 834A-R, such that a given virtual network element (e.g., 830A) includes the control communication and configuration module (e.g., 832A), a set of one or more forwarding table(s) (e.g., 834A), and that portion of the networking hardware 810 that executes the virtual network element (e.g., 830A).

The special-purpose network device 802 is often physically and/or logically considered to include: 1) a ND control plane 824 (sometimes referred to as a control plane) comprising the processor(s) 812 that execute the control communication and configuration module(s) 832A-R; and 2) a ND forwarding plane 826 (sometimes referred to as a forwarding plane, a data plane, or a media plane) comprising the forwarding resource(s) 814 that utilize the forwarding table(s) 834A-R and the physical NIs 816. By way of example, where the ND is a router (or is implementing routing functionality), the ND control plane 824 (the processor(s) 812 executing the control communication and configuration module(s) 832A-R) is typically responsible for participating in controlling how data (e.g., packets) is to be routed (e.g., the next hop for the data and the outgoing physical NI for that data) and storing that routing information in the forwarding table(s) 834A-R, and the ND forwarding plane 826 is responsible for receiving that data on the physical NIs 816 and forwarding that data out the appropriate ones of the physical NIs 816 based on the forwarding table(s) 834A-R.

Figure 8B:
FIG. 8B illustrates an exemplary way to implement a special-purpose network device according to some embodiments of the invention.

FIG. 8B illustrates an exemplary way to implement the special-purpose network device 802 according to some embodiments of the invention. FIG. 8B shows a special-purpose network device including cards 838 (typically hot pluggable). While in some embodiments the cards 838 are of two types (one or more that operate as the ND forwarding plane 826 (sometimes called line cards), and one or more that operate to implement the ND control plane 824 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 836 (e.g., a first full mesh coupling the line cards and a second full mesh coupling all of the cards).

Returning to FIG. 8A, the general-purpose network device 804 includes hardware 840 comprising a set of one or more processor(s) 842 (which are often COTS processors) and physical NIs 846, as well as non-transitory machine-readable storage media 848 having stored therein software 850. During operation, the processor(s) 842 execute the software 850 to instantiate one or more sets of one or more applications 864A-R. While one embodiment does not implement virtualization, alternative embodiments may use different forms of virtualization. For example, in one such alternative embodiment the virtualization layer 854 represents the kernel of an operating system (or a shim executing on a base operating system) that allows for the creation of multiple instances 862A-R called software containers that may each be used to execute one (or more) of the sets of applications 864A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 854 represents a hypervisor (sometimes referred to as a virtual machine monitor (VMM)) or a hypervisor executing on top of a host operating system, and each of the sets of applications 864A-R is run on top of a guest operating system within an instance 862A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 840, directly on a hypervisor (in which case the unikernel is sometimes described as running within a LibOS virtual machine), or in a software container, embodiments can be implemented fully with unikernels running directly on a hypervisor represented by virtualization layer 854, unikernels running within software containers represented by instances 862A-R, or as a combination of unikernels and the above-described techniques (e.g., unikernels and virtual machines both run directly on a hypervisor, unikernels and sets of applications that are run in different software containers).

The instantiation of the one or more sets of one or more applications 864A-R, as well as virtualization if implemented, are collectively referred to as software instance(s) 852. Each set of applications 864A-R, corresponding virtualization construct (e.g., instance 862A-R) if implemented, and that part of the hardware 840 that executes them (be it hardware dedicated to that execution and/or time slices of hardware temporally shared), forms a separate virtual network element(s) 860A-R. The applications can include a roaming support interface 864A-R as described implementing any of the processes, interfaces or structures described herein.

The virtual network element(s) 860A-R perform similar functionality to the virtual network element(s) 830A-R—e.g., similar to the control communication and configuration module(s) 832A and forwarding table(s) 834A (this virtualization of the hardware 840 is sometimes referred to as network function virtualization (NFV)). Thus, NFV may be used to consolidate many network equipment types onto industry standard high-volume server hardware, physical switches, and physical storage, which could be located in Data centers, NDs, and customer premise equipment (CPE). While embodiments of the invention are illustrated with each instance 862A-R corresponding to one VNE 860A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 862A-R to VNEs also apply to embodiments where such a finer level of granularity and/or unikernels are used.

In certain embodiments, the virtualization layer 854 includes a virtual switch that provides similar forwarding services as a physical Ethernet switch. Specifically, this virtual switch forwards traffic between instances 862A-R and the physical NI(s) 846, as well as optionally between the instances 862A-R; in addition, this virtual switch may enforce network isolation between the VNEs 860A-R that by policy are not permitted to communicate with each other (e.g., by honoring virtual local area networks (VLANs)).

The third exemplary ND implementation in FIG. 8A is a hybrid network device 806, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 802) could provide for para-virtualization to the networking hardware present in the hybrid network device 806.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 830A-R, VNEs 860A-R, and those in the hybrid network device 806) receives data on the physical NIs (e.g., 816, 846) and forwards that data out the appropriate ones of the physical NIs (e.g., 816, 846). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 8C:
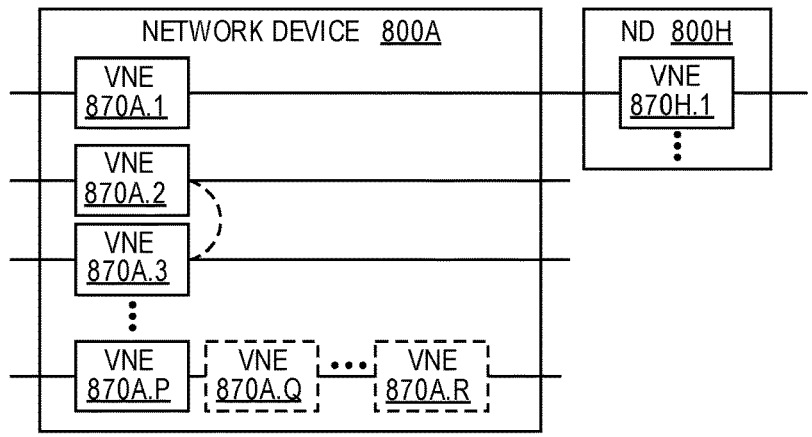
FIG. 8C illustrates various exemplary ways in which virtual network elements (VNEs) may be coupled according to some embodiments of the invention.

FIG. 8C illustrates various exemplary ways in which VNEs may be coupled according to some embodiments of the invention. FIG. 8C shows VNEs 870A.1-870A.P (and optionally VNEs 870A.Q-870A.R) implemented in ND 800A and VNE 870H.1 in ND 800H. In FIG. 8C, VNEs 870A.1-P are separate from each other in the sense that they can receive packets from outside ND 800A and forward packets outside of ND 800A; VNE 870A.1 is coupled with VNE 870H.1, and thus they communicate packets between their respective NDs; VNE 870A.2-870A.3 may optionally forward packets between themselves without forwarding them outside of the ND 800A; and VNE 870A.P may optionally be the first in a chain of VNEs that includes VNE 870A.Q followed by VNE 870A.R (this is sometimes referred to as dynamic service chaining, where each of the VNEs in the series of VNEs provides a different service—e.g., one or more layer 4-7 network services). While FIG. 8C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 8A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 8A may also host one or more such servers (e.g., in the case of the general purpose network device 804, one or more of the software instances 862A-R may operate as servers; the same would be true for the hybrid network device 806; in the case of the special-purpose network device 802, one or more such servers could also be run on a virtualization layer executed by the processor(s) 812); in which case the servers are said to be co-located with the VNEs of that ND.

A virtual network is a logical abstraction of a physical network (such as that in FIG. 8A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network-originated attacks, to avoid malformed route announcements), and management capabilities (e.g., full detection and processing).

Figure 8D:
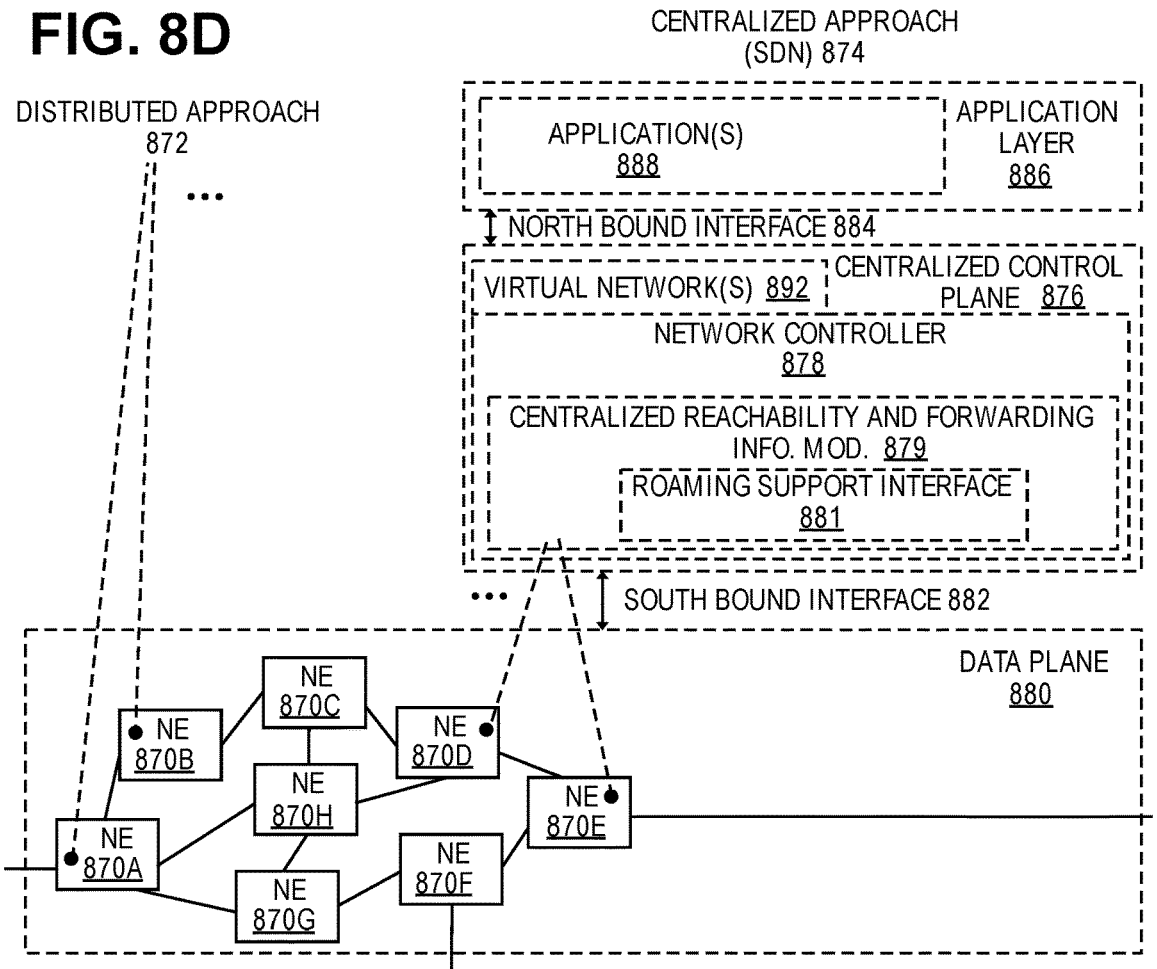
FIG. 8D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 8D illustrates a network with a single network element on each of the NDs of FIG. 8A, and within this straight forward approach contrasts a traditional distributed approach (commonly used by traditional routers) with a centralized approach for maintaining reachability and forwarding information (also called network control), according to some embodiments of the invention. Specifically, FIG. 8D illustrates network elements (NEs) 870A-H with the same connectivity as the NDs 800A-H of FIG. 8A.

FIG. 8D illustrates that the distributed approach 872 distributes responsibility for generating the reachability and forwarding information across the NEs 870A-H; in other words, the process of neighbor discovery and topology discovery is distributed.

For example, where the special-purpose network device 802 is used, the control communication and configuration module(s) 832A-R of the ND control plane 824 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 870A-H (e.g., the processor(s) 812 executing the control communication and configuration module(s) 832A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 824. The ND control plane 824 programs the ND forwarding plane 826 with information (e.g., adjacency and route information) based on the routing structure(s). For example, the ND control plane 824 programs the adjacency and route information into one or more forwarding table(s) 834A-R (e.g., Forwarding Information Base (FIB), Label Forwarding Information Base (LFIB), and one or more adjacency structures) on the ND forwarding plane 826. For layer 2 forwarding, the ND can store one or more bridging tables that are used to forward data based on the layer 2 information in that data. While the above example uses the special-purpose network device 802, the same distributed approach 872 can be implemented on the general-purpose network device 804 and the hybrid network device 806.

FIG. 8D illustrates that a centralized approach 874 (also known as software defined networking (SDN)) that decouples the system that makes decisions about where traffic is sent from the underlying systems that forwards traffic to the selected destination. The illustrated centralized approach 874 has the responsibility for the generation of reachability and forwarding information in a centralized control plane 876 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 876 has a south bound interface 882 with a data plane 880 (sometime referred to the infrastructure layer, network forwarding plane, or forwarding plane (which should not be confused with a ND forwarding plane)) that includes the NEs 870A-H (sometimes referred to as switches, forwarding elements, data plane elements, or nodes). The centralized control plane 876 includes a network controller 878, which includes a centralized reachability and forwarding information module 879 that determines the reachability within the network and distributes the forwarding information to the NEs 870A-H of the data plane 880 over the south bound interface 882 (which may use the OpenFlow protocol). Thus, the network intelligence is centralized in the centralized control plane 876 executing on electronic devices that are typically separate from the NDs.

For example, where the special-purpose network device 802 is used in the data plane 880, each of the control communication and configuration module(s) 832A-R of the ND control plane 824 typically include a control agent that provides the VNE side of the south bound interface 882. In this case, the ND control plane 824 (the processor(s) 812 executing the control communication and configuration module(s) 832A-R) performs its responsibility for participating in controlling how data (e.g., packets) is to be routed (e.g., the next hop for the data and the outgoing physical NI for that data) through the control agent communicating with the centralized control plane 876 to receive the forwarding information (and in some cases, the reachability information) from the centralized reachability and forwarding information module 879 (it should be understood that in some embodiments of the invention, the control communication and configuration module(s) 832A-R, in addition to communicating with the centralized control plane 876, may also play some role in determining reachability and/or calculating forwarding information—albeit less so than in the case of a distributed approach; such embodiments are generally considered to fall under the centralized approach 874, but may also be considered a hybrid approach). The centralized reachability and forwarding information module 879, application layer 886, or other aspect of the centralized approach 874 can include a roaming support interface 881 as described implementing any of the processes, interfaces or structures described herein.

While the above example uses the special-purpose network device 802, the same centralized approach 874 can be implemented with the general purpose network device 804 (e.g., each of the VNE 860A-R performs its responsibility for controlling how data (e.g., packets) is to be routed (e.g., the next hop for the data and the outgoing physical NI for that data) by communicating with the centralized control plane 876 to receive the forwarding information (and in some cases, the reachability information) from the centralized reachability and forwarding information module 879; it should be understood that in some embodiments of the invention, the VNEs 860A-R, in addition to communicating with the centralized control plane 876, may also play some role in determining reachability and/or calculating forwarding information—albeit less so than in the case of a distributed approach) and the hybrid network device 806. In fact, the use of SDN techniques can enhance the NFV techniques typically used in the general-purpose network device 804 or hybrid network device 806 implementations as NFV is able to support SDN by providing an infrastructure upon which the SDN software can be run, and NFV and SDN both aim to make use of commodity server hardware and physical switches.

FIG. 8D also shows that the centralized control plane 876 has a north bound interface 884 to an application layer 886, in which resides application(s) 888. The centralized control plane 876 has the ability to form virtual networks 892 (sometimes referred to as a logical forwarding plane, network services, or overlay networks (with the NEs 870A-H of the data plane 880 being the underlay network)) for the application(s) 888. Thus, the centralized control plane 876 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 8D shows the distributed approach 872 separate from the centralized approach 874, the effort of network control may be distributed differently or the two combined in certain embodiments of the invention. For example: 1) embodiments may generally use the centralized approach (SDN) 874, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 874, but may also be considered a hybrid approach.

While FIG. 8D illustrates the simple case where each of the NDs 800A-H implements a single NE 870A-H, it should be understood that the network control approaches described with reference to FIG. 8D also work for networks where one or more of the NDs 800A-H implement multiple VNEs (e.g., VNEs 830A-R, VNEs 860A-R, those in the hybrid network device 806). Alternatively or in addition, the network controller 878 may also emulate the implementation of multiple VNEs in a single ND. Specifically, instead of (or in addition to) implementing multiple VNEs in a single ND, the network controller 878 may present the implementation of a VNE/NE in a single ND as multiple VNEs in the virtual networks 892 (all in the same one of the virtual network(s) 892, each in different ones of the virtual network(s) 892, or some combination). For example, the network controller 878 may cause an ND to implement a single VNE (a NE) in the underlay network, and then logically divide up the resources of that NE within the centralized control plane 876 to present different VNEs in the virtual network(s) 892 (where these different VNEs in the overlay networks are sharing the resources of the single VNE/NE implementation on the ND in the underlay network).

Figure 8E:
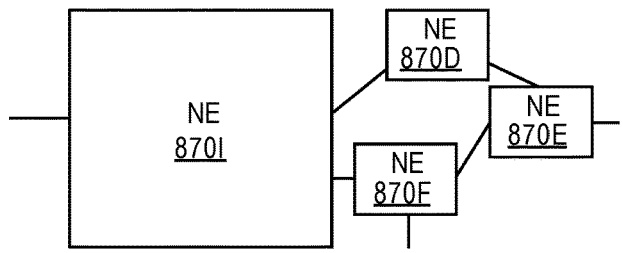
FIG. 8E illustrates the simple case of where each of the NDs implements a single NE, but a centralized control plane has abstracted multiple of the NEs in different NDs into (to represent) a single NE in one of the virtual network(s), according to some embodiments of the invention.
Figure 8F:
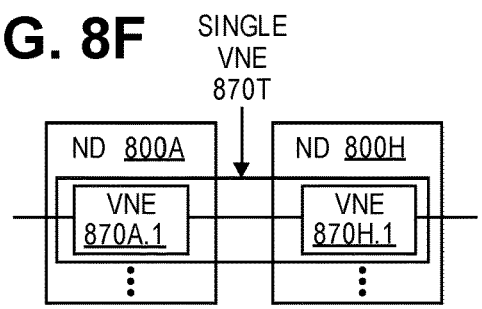
FIG. 8F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 8E and 8F respectively illustrate exemplary abstractions of NEs and VNEs that the network controller 878 may present as part of different ones of the virtual networks 892. FIG. 8E illustrates the simple case of where each of the NDs 800A-H implements a single NE 870A-H (see FIG. 8D), but the centralized control plane 876 has abstracted multiple of the NEs in different NDs (the NEs 870A-C and G-H) into (to represent) a single NE 8701 in one of the virtual network(s) 892 of FIG. 8D, according to some embodiments of the invention. FIG. 8E shows that in this virtual network, the NE 8701 is coupled to NE 870D and 870F, which are both still coupled to NE 870E.

FIG. 8F illustrates a case where multiple VNEs (VNE 870A.1 and VNE 870H.1) are implemented on different NDs (ND 800A and ND 800H) and are coupled to each other, and where the centralized control plane 876 has abstracted these multiple VNEs such that they appear as a single VNE 870T within one of the virtual networks 892 of FIG. 8D, according to some embodiments of the invention. Thus, the abstraction of a NE or VNE can span multiple NDs.

While some embodiments of the invention implement the centralized control plane 876 as a single entity (e.g., a single instance of software running on a single electronic device), alternative embodiments may spread the functionality across multiple entities for redundancy and/or scalability purposes (e.g., multiple instances of software running on different electronic devices).

Figure 9:
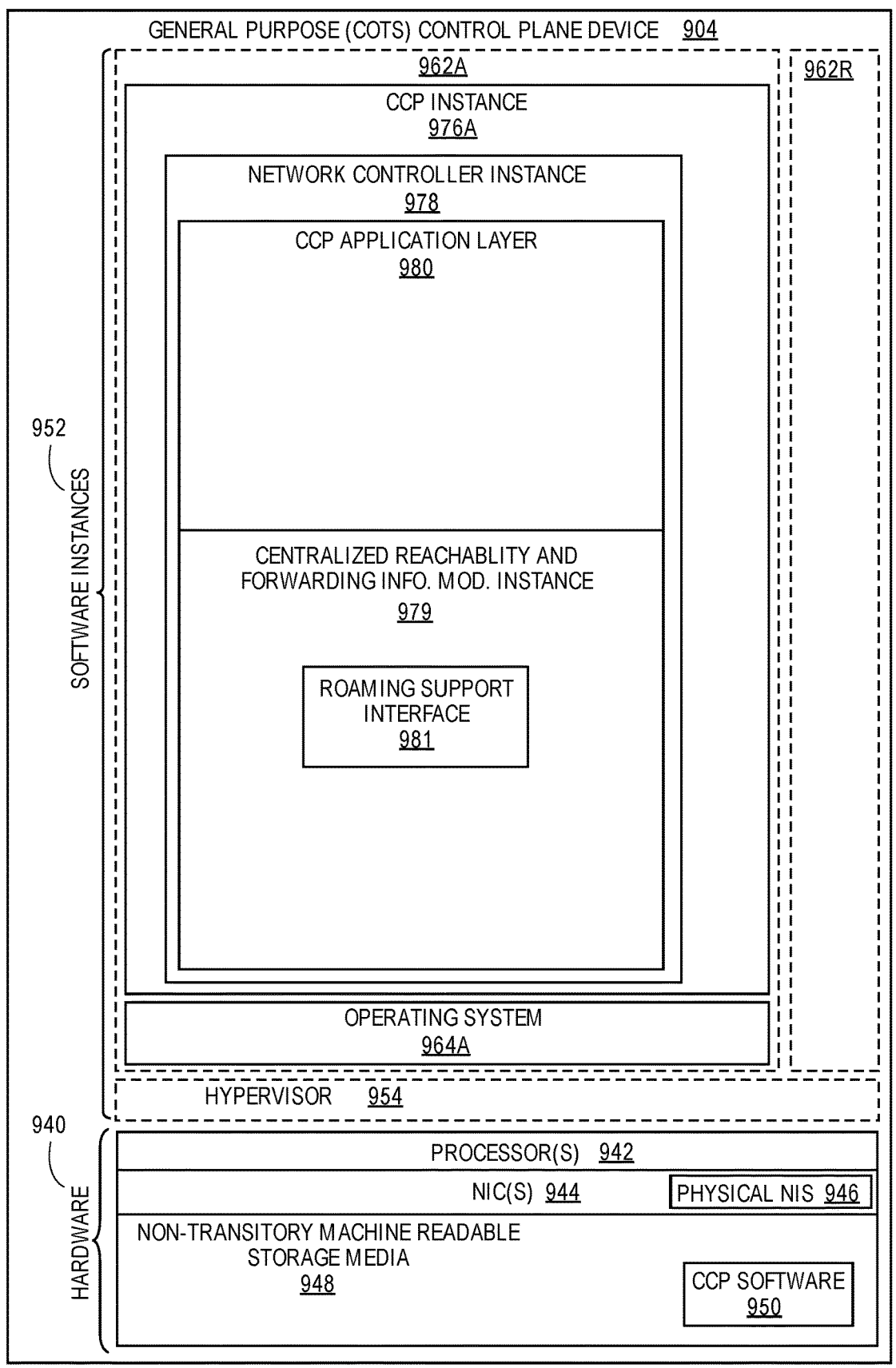
FIG. 9 illustrates a general-purpose control plane device with centralized control plane (CCP) software 950), according to some embodiments of the invention.

Similar to the network device implementations, the electronic device(s) running the centralized control plane 876, and thus the network controller 878 including the centralized reachability and forwarding information module 879, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 9 illustrates, a general-purpose control plane device 904 including hardware 940 comprising a set of one or more processor(s) 942 (which are often COTS processors) and physical NIs 946, as well as non-transitory machine-readable storage media 948 having stored therein centralized control plane (CCP) software 950.

In embodiments that use compute virtualization, the processor(s) 942 typically execute software to instantiate a virtualization layer 954 (e.g., in one embodiment the virtualization layer 954 represents the kernel of an operating system (or a shim executing on a base operating system) that allows for the creation of multiple instances 962A-R called software containers (representing separate user spaces and also called virtualization engines, virtual private servers, or jails) that may each be used to execute a set of one or more applications; in another embodiment the virtualization layer 954 represents a hypervisor (sometimes referred to as a virtual machine monitor (VMM)) or a hypervisor executing on top of a host operating system, and an application is run on top of a guest operating system within an instance 962A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 940, directly on a hypervisor represented by virtualization layer 954 (in which case the unikernel is sometimes described as running within a LibOS virtual machine), or in a software container represented by one of instances 962A-R). Again, in embodiments where compute virtualization is used, during operation an instance of the CCP software 950 (illustrated as CCP instance 976A) is executed (e.g., within the instance 962A) on the virtualization layer 954. In embodiments where compute virtualization is not used, the CCP instance 976A is executed, as a unikernel or on top of a host operating system, on the "bare metal" general purpose control plane device 904. The instantiation of the CCP instance 976A, as well as the virtualization layer 954 and instances 962A-R if implemented, are collectively referred to as software instance(s) 952.

In some embodiments, the CCP instance 976A includes a network controller instance 978. The network controller instance 978 includes a centralized reachability and forwarding information module instance 979 (which is a middleware layer providing the context of the network controller 878 to the operating system and communicating with the various NEs), and an CCP application layer 980 (sometimes referred to as an application layer) over the middleware layer (providing the intelligence required for various network operations such as protocols, network situational awareness, and user-interfaces). At a more abstract level, this CCP application layer 980 within the centralized control plane 876 works with virtual network view(s) (logical view(s) of the network) and the middleware layer provides the conversion from the virtual networks to the physical view. The centralized reachability and forwarding information module 979, application layer 980, or other aspect of the control plane device 904 can include a roaming support interface 981 as described implementing any of the processes, interfaces or structures described herein.

The centralized control plane 876 transmits relevant messages to the data plane 880 based on CCP application layer 980 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 880 may receive different messages, and thus different forwarding information. The data plane 880 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 880, the packet (or a subset of the packet header and content) is typically forwarded to the centralized control plane 876. The centralized control plane 876 will then program forwarding table entries into the data plane 880 to accommodate packets belonging to the flow of the unknown packet. Once a specific forwarding table entry has been programmed into the data plane 880 by the centralized control plane 876, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multipath forwarding and IP multipath) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

A Layer 3 (L3) Link Aggregation (LAG) link is a link directly connecting two NDs with multiple IP-addressed link paths (each link path is assigned a different IP address), and a load distribution decision across these different link paths is performed at the ND forwarding plane; in which case, a load distribution decision is made between the link paths.

Some NDs include functionality for authentication, authorization, and accounting (AAA) protocols (e.g., RADIUS (Remote Authentication Dial-In User Service), Diameter, and/or TACACS+ (Terminal Access Controller Access Control System Plus). AAA can be provided through a client/server model, where the AAA client is implemented on a ND and the AAA server can be implemented either locally on the ND or on a remote electronic device coupled with the ND. Authentication is the process of identifying and verifying a subscriber. For instance, a subscriber might be identified by a combination of a username and a password or through a unique key. Authorization determines what a subscriber can do after being authenticated, such as gaining access to certain electronic device information resources (e.g., through the use of access control policies). Accounting is recording user activity. By way of a summary example, end user devices may be coupled (e.g., through an access network) through an edge ND (supporting AAA processing) coupled to core NDs coupled to electronic devices implementing servers of service/content providers. AAA processing is performed to identify for a subscriber the subscriber record stored in the AAA server for that subscriber. A subscriber record includes a set of attributes (e.g., subscriber name, password, authentication information, access control information, rate-limiting information, policing information) used during processing of that subscriber's traffic.

Certain NDs (e.g., certain edge NDs) internally represent end user devices (or sometimes customer premise equipment (CPE) such as a residential gateway (e.g., a router, modem)) using subscriber circuits. A subscriber circuit uniquely identifies within the ND a subscriber session and typically exists for the lifetime of the session. Thus, a ND typically allocates a subscriber circuit when the subscriber connects to that ND, and correspondingly de-allocates that subscriber circuit when that subscriber disconnects. Each subscriber session represents a distinguishable flow of packets communicated between the ND and an end user device (or sometimes CPE such as a residential gateway or modem) using a protocol, such as the point-to-point protocol over another protocol (PPPoX) (e.g., where X is Ethernet or Asynchronous Transfer Mode (ATM)), Ethernet, 802.1Q Virtual LAN (VLAN), Internet Protocol, or ATM). A subscriber session can be initiated using a variety of mechanisms (e.g., manual provisioning a dynamic host configuration protocol (DHCP), DHCP/client-less internet protocol service (CLIPS) or Media Access Control (MAC) address tracking). For example, the point-to-point protocol (PPP) is commonly used for digital subscriber line (DSL) services and requires installation of a PPP client that enables the subscriber to enter a username and a password, which in turn may be used to select a subscriber record. When DHCP is used (e.g., for cable modem services), a username typically is not provided; but in such situations other information (e.g., information that includes the MAC address of the hardware in the end user device (or CPE)) is provided. The use of DHCP and CLIPS on the ND captures the MAC addresses and uses these addresses to distinguish subscribers and access their subscriber records.

A virtual circuit (VC), synonymous with virtual connection and virtual channel, is a connection oriented communication service that is delivered by means of packet mode communication. Virtual circuit communication resembles circuit switching, since both are connection oriented, meaning that in both cases data is delivered in correct order, and signaling overhead is required during a connection establishment phase. Virtual circuits may exist at different layers. For example, at layer 4, a connection oriented transport layer datalink protocol such as Transmission Control Protocol (TCP) may rely on a connectionless packet switching network layer protocol such as IP, where different packets may be routed over different paths, and thus be delivered out of order. Where a reliable virtual circuit is established with TCP on top of the underlying unreliable and connectionless IP protocol, the virtual circuit is identified by the source and destination network socket address pair, i.e. the sender and receiver IP address and port number. However, a virtual circuit is possible since TCP includes segment numbering and reordering on the receiver side to prevent out-of-order delivery. Virtual circuits are also possible at Layer 3 (network layer) and Layer 2 (datalink layer); such virtual circuit protocols are based on connection oriented packet switching, meaning that data is always delivered along the same network path, i.e. through the same NEs/VNEs. In such protocols, the packets are not routed individually and complete addressing information is not provided in the header of each data packet; only a small virtual channel identifier (VCI) is required in each packet; and routing information is transferred to the NEs/VNEs during the connection establishment phase; switching only involves looking up the virtual channel identifier in a table rather than analyzing a complete address. Examples of network layer and datalink layer virtual circuit protocols, where data always is delivered over the same path: X.25, where the VC is identified by a virtual channel identifier (VCI); Frame relay, where the VC is identified by a VCI; Asynchronous Transfer Mode (ATM), where the circuit is identified by a virtual path identifier (VPI) and virtual channel identifier (VCI) pair; General Packet Radio Service (GPRS); and Multiprotocol label switching (MPLS), which can be used for IP over virtual circuits (Each circuit is identified by a label).

Certain NDs (e.g., certain edge NDs) use a hierarchy of circuits. The leaf nodes of the hierarchy of circuits are subscriber circuits. The subscriber circuits have parent circuits in the hierarchy that typically represent aggregations of multiple subscriber circuits, and thus the network segments and elements used to provide access network connectivity of those end user devices to the ND. These parent circuits may represent physical or logical aggregations of subscriber circuits (e.g., a virtual local area network (VLAN), a permanent virtual circuit (PVC) (e.g., for Asynchronous Transfer Mode (ATM)), a circuit-group, a channel, a pseudo-wire, a physical NI of the ND, and a link aggregation group). A circuit-group is a virtual construct that allows various sets of circuits to be grouped together for configuration purposes, for example aggregate rate control. A pseudo-wire is an emulation of a layer 2 point-to-point connection-oriented service. A link aggregation group is a virtual construct that merges multiple physical NIs for purposes of bandwidth aggregation and redundancy. Thus, the parent circuits physically or logically encapsulate the subscriber circuits.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for supporting roaming broadband services, the method implemented by a computing device in a parent provider network of a user having a unique user identifier to enable the user to utilize services associated with a broadband access service contract of the user of the parent provider network in a visited location in the parent provider network or in a roaming provider network, the method comprising:
receiving a registration request from the user;
receiving a request from an operational support system or business support system of the roaming provider network for broadband access service information of the user upon determining that the registration request is received from the user via the roaming provider network;
determining the unique user identifier for the user when the user is connected within the parent provider network;
determining services for the user based on the unique user identifier;
determining whether the user is connected to a home customer premise equipment (CPE) in the parent provider network; and
configuring services and resources at a local data center in the parent provider network, in response to the user being connected to the visited location in the parent provider network.

2. The method of claim 1, further comprising:
configuring a virtual CPE to re-route traffic to the user at the visited location.

3. The method of claim 1, further comprising:
releasing services and resource at a home data center for the user.

4. The method of claim 1, further comprising:
sending broadband access service information to the roaming provider network, in response to determining that the user is in the roaming provider network.

5. A method for supporting roaming broadband services, the method implemented by a computing device in a roaming provider network of a user having a unique user identifier to enable the user to utilize services associated with a broadband access service contract of a user of a parent provider network in the roaming provider network, the method comprising:
receiving a registration request from the user visiting the roaming provider network;
determining the unique user identifier for the user;
identifying the parent provider network for the user;
requesting the broadband access service information for the user from the parent provider network;
receiving the broadband access service information from the parent provider network;
instantiating service for the user in the roaming provider network at a local customer premise equipment (CPE) in the roaming provider network; and
configuring a virtual CPE to route data traffic to the user in the roaming provider network.

6. The method of claim 5, further comprising:
negotiating aspects of the broadband access service information to implement in the roaming provider network with the user or parent provider network.

7. The method of claim 6, wherein the broadband access service information includes a service level agreement (SLA) and a subset of SLA terms is determined to be supported by the roaming provider network.

8. The method of claim 5, wherein the requesting of the SLA from the provider network is a request sent to an operations support system (OSS) or business support system (BSS) in the parent provider network.

9. A computing device to implement a method for supporting roaming broadband services, the method implemented by a computing device in a parent provider network of a user having a unique user identifier to enable the user to utilize services associated with broadband access services contract of the parent provider network in a visited location in the parent provider network or in a roaming provider network, the computing device comprising:
a non-transitory computer-readable medium having stored therein a roaming support interface; and
a processor coupled to the non-transitory computer-readable medium, the processor to execute the roaming support interface, the roaming support interface to receive a registration request from the user, to receive a request from an operational support system or business support system of the roaming provider network for broadband access service information of the user upon determining that the registration request is received from the user via the roaming provider network, to determine the unique user identifier for the user when the user is connected within the parent provider network, to determine broadband access services for the user based on the unique user identifier, to determine whether the user is connected to a home customer premise equipment (CPE) in the parent provider network, and to configure broadband access services and resources at a local data center in the parent provider network, in response to the user being connected to the visited location in the parent provider network.

10. The computing device of claim 9, wherein the roaming support interface is further to configure a virtual CPE to re-route traffic to the user at the visited location.

11. The computing device of claim 9, wherein the roaming support interface is further to release services and resource at a home data center for the user.

12. The computing device of claim 9, wherein the roaming support interface is further to send broadband access service information to the roaming provider network, in response to determining that the user is in the roaming provider network.

13. A computing device to implement a method for supporting roaming broadband services, the method implemented by a computing device in a roaming provider network of a user having a unique user identifier to enable the user to utilize services associated with a broadband access service contract of a parent provider network in the roaming provider network, the computing device comprising:
a non-transitory computer-readable medium having stored therein a roaming support interface; and
a processor coupled to the non-transitory computer-readable medium, the processor to execute the roaming support interface, the roaming support interface to receive a registration request from the user visiting the roaming provider network, to determine the unique user identifier for the user, to identify the parent provider network for the user, to request the SLA for the user from the parent provider network, to receive the SLA from the parent provider network, to instantiate service for the user in the roaming provider network at a local customer premise equipment (CPE) in the roaming provider network, and to configure a virtual CPE to route data traffic to the user in the roaming provider network.

14. The computing device of claim 13, wherein the roaming support interface is further negotiating aspects of the broadband access service information to implement in the roaming provider network with the user or parent provider network.

15. The computing device of claim 14, wherein the broadband access service information includes a service level agreement (SLA) and a subset of SLA terms is determined to be supported by the roaming provider network.

16. The computing device of claim 13, wherein the requesting of the broadband access service information from the provider network is a request sent to an operations support system (OSS) or business support system (BSS) in the parent provider network.

\* \* \* \* \*